(12) United States Patent
Moriwaki et al.

(10) Patent No.: US 7,982,603 B2
(45) Date of Patent: Jul. 19, 2011

(54) SENSOR NET SYSTEM, SENSOR NET SYSTEM DATA MANAGING METHOD, AND SENSOR NET SYSTEM DATA MANAGING PROGRAM

(75) Inventors: Norihiko Moriwaki, Hino (JP); Toshiyuki Odaka, Fuchu (JP); Kazuo Yano, Hino (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 12/223,860

(22) PCT Filed: Mar. 28, 2006

(86) PCT No.: PCT/JP2006/307020
§ 371 (c)(1),
(2), (4) Date: Aug. 12, 2008

(87) PCT Pub. No.: WO2007/110968
PCT Pub. Date: Oct. 4, 2007

(65) Prior Publication Data
US 2010/0161630 A1 Jun. 24, 2010

(51) Int. Cl.
*G08B 1/08* (2006.01)
(52) U.S. Cl. .......... 340/539.22; 340/531; 707/758; 455/524; 709/208; 709/207; 709/224
(58) Field of Classification Search .......... None
See application file for complete search history.

(56) References Cited

U.S. PATENT DOCUMENTS

| | | | |
|---|---|---|---|
| 6,735,630 B1 * | 5/2004 | Gelvin et al. | 709/224 |
| 6,826,602 B1 * | 11/2004 | Kreiner et al. | 709/219 |
| 6,859,831 B1 * | 2/2005 | Gelvin et al. | 709/224 |
| 7,020,701 B1 * | 3/2006 | Gelvin et al. | 709/224 |
| 7,298,259 B2 * | 11/2007 | Moriwaki | 340/539.22 |
| 7,298,529 B2 * | 11/2007 | Haas et al. | 358/487 |
| 7,398,164 B2 * | 7/2008 | Ogushi et al. | 702/42 |
| 7,536,255 B2 * | 5/2009 | Otsuki et al. | 701/200 |
| 7,587,221 B2 * | 9/2009 | Mishina et al. | 455/524 |
| 2004/0103139 A1 * | 5/2004 | Hubbard et al. | 709/201 |
| 2005/0086264 A1 * | 4/2005 | Masuda | 707/104.1 |
| 2006/0202834 A1 * | 9/2006 | Moriwaki | 340/573.1 |

FOREIGN PATENT DOCUMENTS

| | | |
|---|---|---|
| JP | 07-162965 | 12/1993 |
| JP | 07-162965 | 6/1995 |
| JP | 2005-122491 | 10/2003 |
| JP | 2006-010533 | 6/2004 |
| JP | 2006-010533 | 1/2006 |

OTHER PUBLICATIONS

International Search Report of PCT/JP2006/307020 mailed Jul. 11, 2006.

* cited by examiner

*Primary Examiner* — Apu M Mofiz
*Assistant Examiner* — Hung D Le
(74) *Attorney, Agent, or Firm* — Stites & Harbison PLLC; Juan Carlos A. Marquez, Esq.

(57) ABSTRACT

In order to easily provide data successively generated from a real world sensor network in a time series to a user, a unit for generally and flexibly performing mapping between a source for generating physical electronic information (for example, a tiny sensor node) and sensing data to be provided to the user is provided. Therefore, a manager of the sensor network is composed of a device management table for mapping among a wireless sensor node, a wireless base station, and a data managing server, a real world model table capable of including device information and giving plural attributes, a registration/search processing unit for registering/searching that information, and a data manager for data mapping between the tables.

19 Claims, 24 Drawing Sheets

FIG.11

DEVICE-INFORMATION SET SCREEN (DVSC)

File | User | Wizard | Data | Configuration

[Dvice] [Model] [Data]   Search: [    ]   [Upload]

DEVICE TYPE (DVT)

| Type |
|---|
| RS |
| GW |
| Sensor Node Type |
| Sensor Node |
| Sensor |

| Model Name |
|---|
| All Model |

| Temperature |
|---|
| All Temperature |

| Humidity |
|---|
| All Humidity |

DEVICE TABLE (DVTB)

| ID | Name | IP Address | Port |
|---|---|---|---|
| R1 | RS1 | 127.0.0.1 | 12300 |
| R2 | RS2 | 125.3.3.1 | 12300 |

CUSTOM LIST (CTL)

| Custom List |
|---|
| Temp. over 23°C |

[Renewal]

FIG.13

| ID | NAME | IP ADDRESS | PORT |
|---|---|---|---|
| R1 | RS1 | 127.0.0.1 | 12300 |
| R2 | RS2 | 125.3.3.1 | 12300 |

FIG.14

| ID | NAME | RS | IP ADDRESS | PORT | POWER | RADIO CHANNEL | PAN ID |
|---|---|---|---|---|---|---|---|
| G1 | GW1 | RS1 | 127.0.0.2 | 12300 | 100 | 50 | 2 |
| G2 | GW2 | RS2 | 125.3.3.2 | 12300 | 200 | 100 | 1 |

FIG.15

| ID | NAME | RS | TYPE | GLOBAL ID | BATTERY | SENSING CYCLE | POWER | RADIO CHANNEL | BATTERY THRESHOLD |
|---|---|---|---|---|---|---|---|---|---|
| N1 | SN1 | RS1 | TempHumi | 31313131313131 | 100 | 10 | 50 | 50 | 200 |
| N2 | SN2 | RS2 | Health | 33333333333333 | 200 | 20 | 100 | 100 | 300 |

FIG.16

| ID | NAME | SENSOR NODE | TYPE | SENSING CYCLE | UPPER DATA THRESHOLD | LOWER DATA THRESHOLD |
|---|---|---|---|---|---|---|
| S1 | SE1 | SN1 | TempHumi | 10 | 100 | 50 |
| S2 | SE2 | SN2 | Health | 20 | 200 | 100 |

FIG.17

| ID | TYPE |
|---|---|
| NT1 | TempHumi |
| NT2 | Health |

FIG. 18

MDSC — MODEL INFORMATION SET SCREEN (MODEL TYPE REGISTRATION)

File  User  Wizard  Data  Configuration

[Dvice] [Model] [Data]   Search: [    ] [Upload]

| Type | Model Name | Temperature | Humidity |
|---|---|---|---|
| THERMOHYDROMETER | All Model | All Temperature | All Humidity |

MODEL TYPE (MDT)

Custom List
Temp. over 23°C

CUSTOM LIST (CTL)

MODEL DATA (MDD)

| ID | Name | Temperature | Humidity |
|---|---|---|---|

[Renewal]

FIG. 20

POPUP SCREEN FOR NEWLY MAKING MODEL TYPE — MTN

Model Type Name: THERMOHYDROMETER

ENT — ENTRY ADDITION

| ENTRY TYPE |
|---|
| CHARACTER STRING |
| SENSOR NODE |
| SENSOR |
| GW |
| MODEL |

ENN

| ENTRY NAME |
|---|
| Name |
| Temperature |
| Humidity |

COMPLETION

MDPP

FIG. 21

MDSC — MODEL INFORMATION SET SCREEN (MODEL TYPE REGISTRATION)

File  User  Wizard  Data  Configuration

[Dvice] [Model]     [Data]

| Type |
|---|
| THERMOHYDROMETER |

← MODEL TYPE (MDT)

| Model Name | Temperature | Humidity |
|---|---|---|
| All Model | All Temperature | All Humidity |

Search: [ ]    [Upload]

MODEL DATA (MDD) →

| ID | Name | Temperature | Humidity |
|---|---|---|---|
| MD1 | THERMOHYDROMETER OF CONFERENCE ROOM A | SE1 | SE2 |
| MD2 | THERMOHYDROMETER OF CONFERENCE ROOM B | SE3 | SE4 |
| MD3 | ROOFTOP THERMOHYDROMETER | SE1 ▽ | |
| | | SE2 | |
| | | SE3 | |
| | | SE4 | |
| | | SE5 | |
| | | SE6 | |

| Custom List |
|---|
| Temp. over 23°C |

← CUSTOM LIST (CTL)

[Renewal]

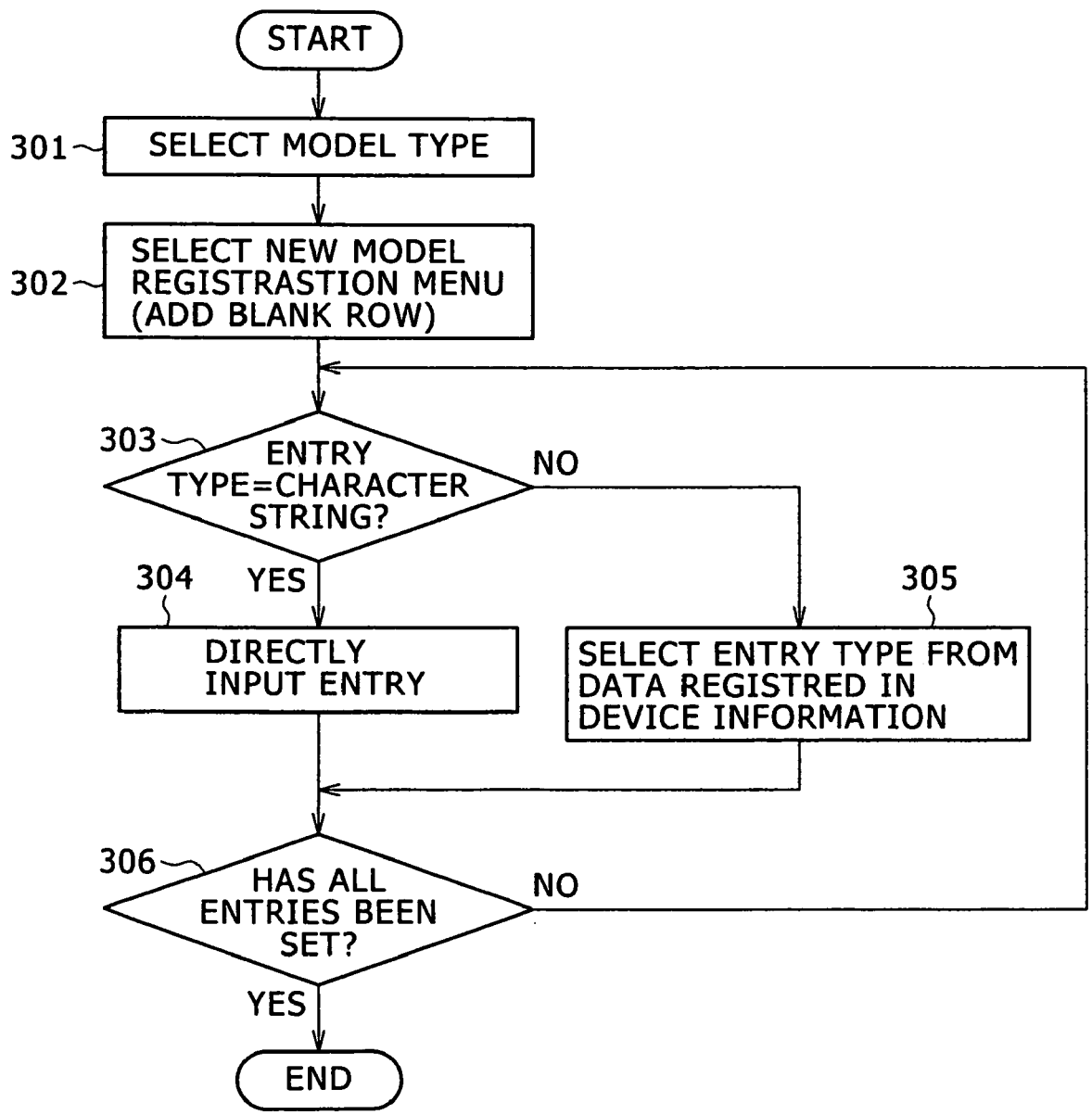

FIG.24

DTSC

DATA VIEWER

File  User  Wizard  Data  Configuration

[Dvice]  [Model]  [Data]      Search:        [Upload]

| Type | Model Name | Temperature | Humidity |
|---|---|---|---|
| THERMOHYDROMETER | All Model | All Temperature | All Humidity |
| DOOR SECURITY SENSOR | THERMOHYDROMETER OF CONFERENCE ROOM A | | |
| WATER VOLUME SENSOR | THERMOHYDROMETER OF CONFERENCE ROOM B | | |
| | ROOFTOP THERMOHYDROMETER | | |

MODEL DATA (MDD)

| Name | Temperature | Humidity |
|---|---|---|
| THERMOHYDROMETER OF CONFERENCE ROOM A | 20.5 | 54.3 |

Custom List
Temp. over 23°C

[Renewal]

MODEL TYPE (MDT)

CUSTOM LIST (CTL)

FIG. 26

MODEL DATA (MDD)

DTSC

DATA VIEWER

File  User  Wizard  Data  Configuration

[Dvice]  [Model]  [Data]         Search: [        ]  [Upload]

| Type | Model Name | Building | Floor |
|---|---|---|---|
| THERMOHYDROMETER | All Model | All Building | All Floor |
| DOOR SECURITY SENSOR | THERMOHYDROMETER OF CONFERENCE ROOM A | A Building | 1st Floor |
| WATER VOLUME SENSOR | THERMOHYDROMETER OF CONFERENCE ROOM B | B Building | 2nd Floor |
|  | ROOFTOP THERMOHYDROMETER |  | 3rd Floor |
|  |  |  | Roof |

| Name | Building | Floor | Floor | Temp | Humidity |
|---|---|---|---|---|---|
| THERMOHYDROMETER OF CONFERENCE ROOM A | A | 1st |  | 20.5 | 54.3 |

Custom List
Temp. over 23°C

[Renewal]

MODEL TYPE (MDT)

CUSTOM LIST (CTL)

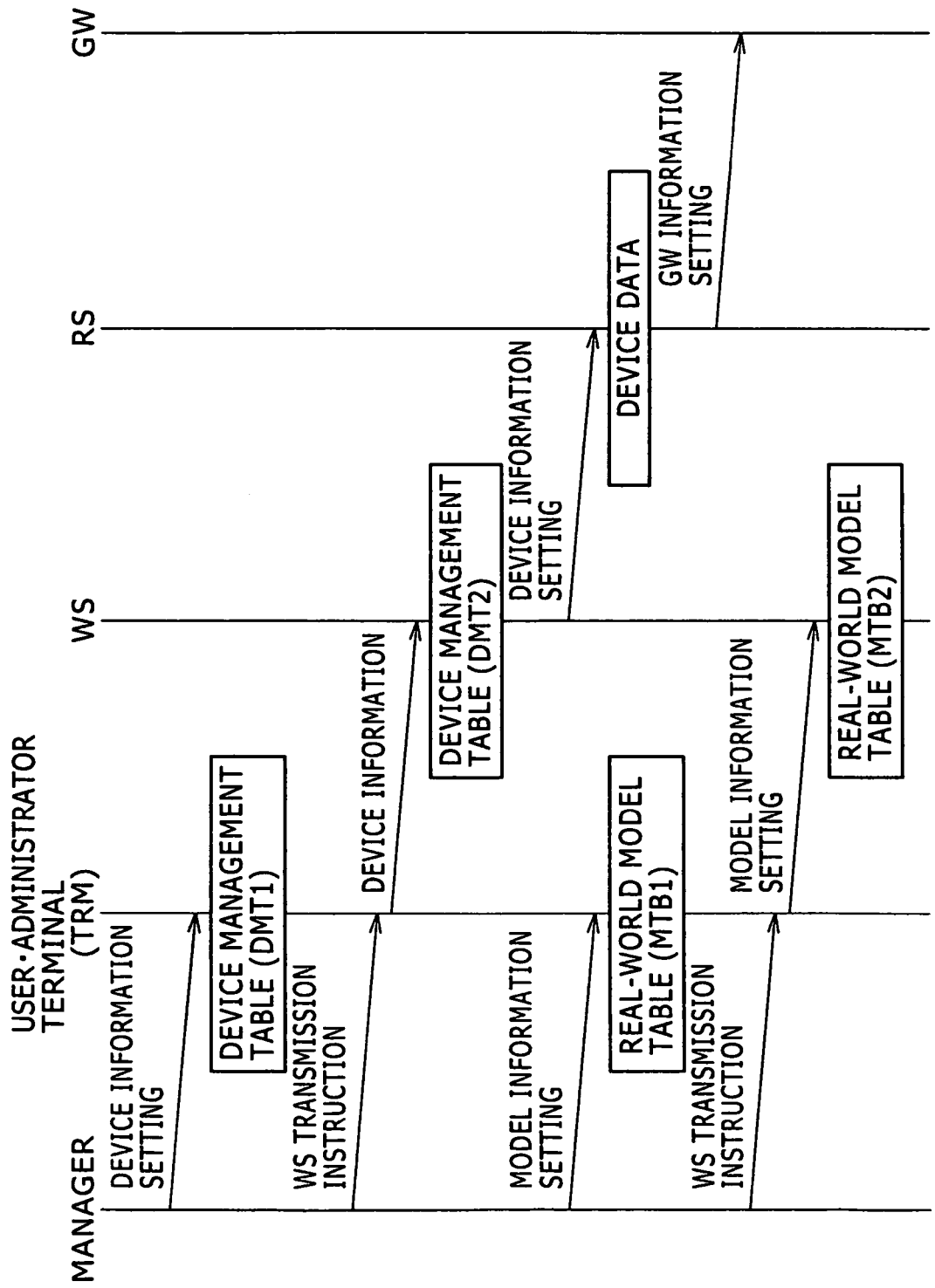

FIG.33

CSVF1

```
RS, ID, R1, Name, RS1, IP, 127.001, Port, 12300
RS, ID, R1, Name, RS1, IP, 127.001, Port, 12300
GW, ID, G1, Name, GW1, RS, RS1, IP, 127.0.0.2, Port, 12300, Power, 100, Radio, 50, PANID, 2
NODE, ID, N1, Name, SN1, RS, RS1, Type, TempHumi, GID, 31313131313131, Cycle, 10, Power, 50, Channel, 50, Threshold, 200
SENSOR, ID, S1, Name, SE1, Node, SN1, Type, TempHumi, Cycle, 10, Upper, 100, Lower, 50
NDTYPE, ID, NT1, Type, TempHumi
```

FIG.34

CSVF2

```
RS, ID, R1, Name, RS1, IP, 127.001, Port, 12300
RS, ID, R1, Name, RS1, IP, 127.001, Port, 12300
GW, ID, G1, Name, GW1, RS, RS1, IP, 127.0.0.2, Port, 12300, Power, 100, Radio, 50, PANID, 2
NODE, ID, N1, Name, SN1, RS, RS1, Type, TempHumi, GID, 31313131313131, Cycle, 10, Power, 50, Channel, 50, Threshold, 200
SENSOR, ID, S1, Name, SE1, Node, SN1, Type, TempHumi, Cycle, 10, Upper, 100, Lower, 50
NDTYPE, ID, NT1, Type, TempHumi
MDTYPE, ID, MT1, Name, THERMOHYDROMETER, Entry, Name, data, Entry, Temp, Sensor, Entry, Humid, Sensor
MODEL, ID, MD1, Type, MT1, Entry, Name, THERMOHYDROMETER OF CONFERENCE ROOM A, Entry, Temp, SE1, Entry, Humid, SE2
```

FIG.35

| MODEL TYPE NAME (MTN) | ENTRY NAME (ENN) | ENTRY TYPE (ENT) |
|---|---|---|
| THERMOHYDROMETER | Name | CHARACTER STRING |
| | Temperature | SENSOR |
| | Humidity | SENSOR |

SENSOR NET SYSTEM, SENSOR NET SYSTEM DATA MANAGING METHOD, AND SENSOR NET SYSTEM DATA MANAGING PROGRAM

BACKGROUND OF THE INVENTION

1. Field of the Invention

The present invention relates to methods of managing and using sensing data generated from plural sensors connected to a network.

2. Description of the Related Art

Recently, sensor network technologies for acquiring a large amount of sensing data from plural tiny wireless sensor nodes through a network have been developed. Sensor networks are different from the current Internet in that current services provided via Internet are restricted to virtual spaces, while sensor networks are fused with real spaces. Since sensor networks are fused with real spaces, they can provide various services depending on timing and locations. In other words, real world information is acquired as a large amount of sensor data, and transmitted via networks, and utilized for applications such as disaster monitoring, equipment monitoring, and security from a remote place. Further, a general-purposed sensing infrastructure can be applied to various applications. In JP-A-2005-122491, a technology is disclosed in which sensing environment and application environment are separately managed and the sensing environment is shared by plural applications.

In information search systems according to the related art, static electronic information to be searched for is input to and accumulated in a database on a network. Users can acquire desired information from a directory containing accumulated data information by changing of view or sorting, or search based on a keyword or an attribute.

However, in comparing with the case above, when considering a system for acquiring successive and time series sensing data by placing physical electronic devices within a real space (e.g., a sensor network), units and procedures for generally and flexibly matching physical electronic information generating sources (e.g., tiny sensor nodes) with sensing information to be presented to users are required. For this reason, it is difficult to apply information search systems as they are according to the related art.

For example, in JP-A-2005-122491, there is disclosed a technology of matching sensing environment to a specific application in advance for routing sensing data to pre-assigned applications. However, it is not disclosed how to easily present a large amount of sensing data, which is one of the features of the sensor networks, to users.

SUMMARY OF THE INVENTION

It is an object of the invention to easily present time series data, successively generated from sensor nodes located in the real world, to users.

In order to achieve the above, a system, a procedure, and a user interface for generally and flexibly matching physical electronic information generating sources (e.g., tiny sensor nodes) with sensing information to be presented to users are provided.

Specifically, it is provided a method for a sensing-information-type-based management and an identification management of a sensor node and a sensor on the sensor node in the real world. Further, provided are a method of managing the spatial position of a data generating source (a sensor node) and a method of specifying related attribute information for facilitating the spatial-position management, and a method of matching wireless base stations, servers, and sensor nodes with one another to exactly acquire specific sensing information.

A manager of a sensor network includes a device management table for matching wireless sensor nodes, wireless base stations, and data managing servers with one another, a real world model table capable of specifying plural attributes including device information, a registration/search processing unit for registering/searching for information in/from the tables, and a data manager for matching data between the tables.

BRIEF DESCRIPTION OF THE DRAWINGS

FIG. 11 is a drawing illustrating an example of a device-information set screen;

FIG. 13 is a drawing illustrating an example of a set RS table;

FIG. 14 is a drawing illustrating an example of a set GW table;

FIG. 15 is a drawing illustrating an example of a set sensor node table;

FIG. 16 is a drawing illustrating an example of a set sensor table;

FIG. 17 is a drawing illustrating an example of a set sensor node type;

FIG. 18 is a drawing illustrating an example of a model information set screen for registering a model type;

FIG. 20 is a drawing illustrating an example of a screen for newly adding a model type;

FIG. 21 is a drawing illustrating an example of a model information set screen for model registration;

FIG. 22 is a drawing illustrating an example of a model registration flow;

FIG. 24 is a drawing illustrating an example of a data viewer;

FIG. 26 is a drawing illustrating an example of a data viewer;

FIG. 27 is a drawing illustrating an example of a device/model set flow;

FIG. 33 is a drawing illustrating an example of a file description for setting device information;

FIG. 34 is a drawing illustrating an example of a file description for setting device information and model information; and FIG. 35 is a drawing illustrating an example of a set model type table.

DETAILED DESCRIPTION OF THE PREFERRED EMBODIMENTS

First Embodiment

Figure 3:
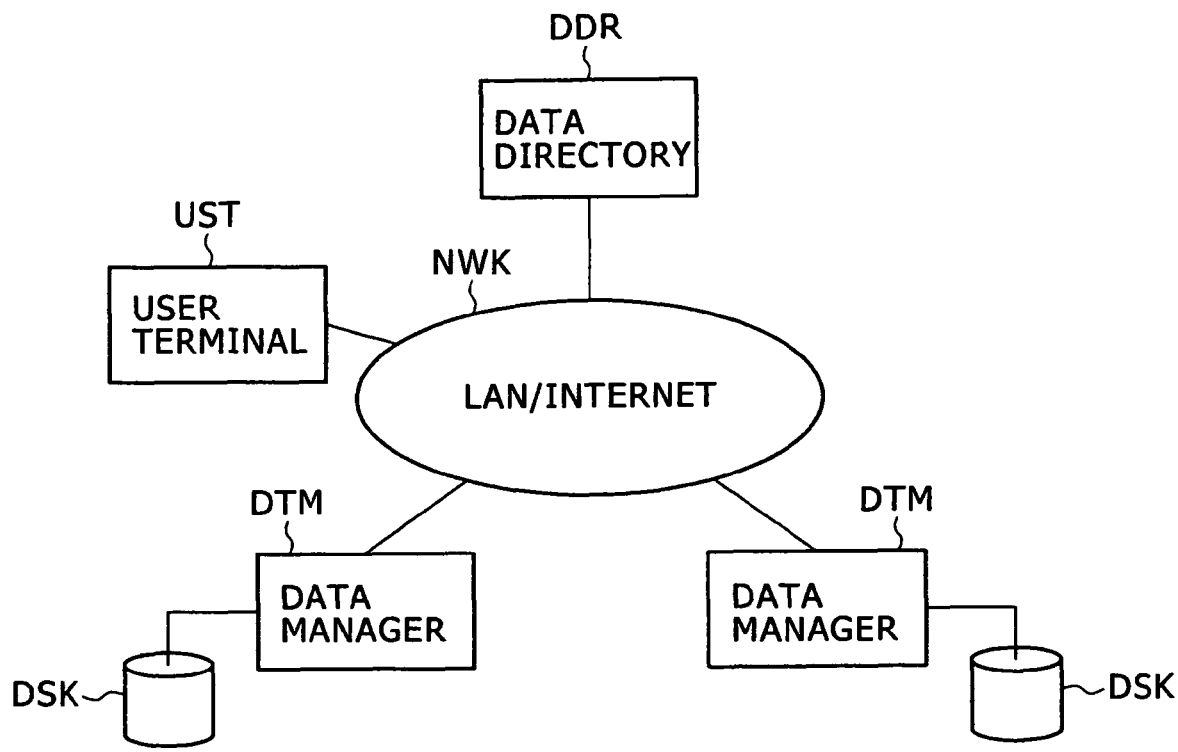
FIG. 3 is a drawing illustrating an example of a general distributed data managing system.

Hereinafter, an exemplary embodiment of the invention will be described with reference to the accompanying drawings. FIG. 3 shows an example of a general distributed data managing system using a network NWK (LAN, Internet, etc.). Content data is generated in a user terminal UST by a user, is transmitted to a data manager DTM such as a server through the network NWK such as the Internet, and is stored in a disk device DSK connected to the data manager DTM.

A data directory DDR manages the location of data in the network. A user on the network accesses the data directory DDR, thereby acquiring the location of desired data, and then accesses the data. For example, access to data on the Internet is generally performed by acquiring the location of desired data by a URL (uniform resource locator) from an index site (a server corresponding to the above-mentioned data directory). A URL is an address that uniquely identifies the locations of a document, a resource, etc. that exist on the Internet, and includes a protocol name, a domain name server, and a path name of a document.

Figure 1:
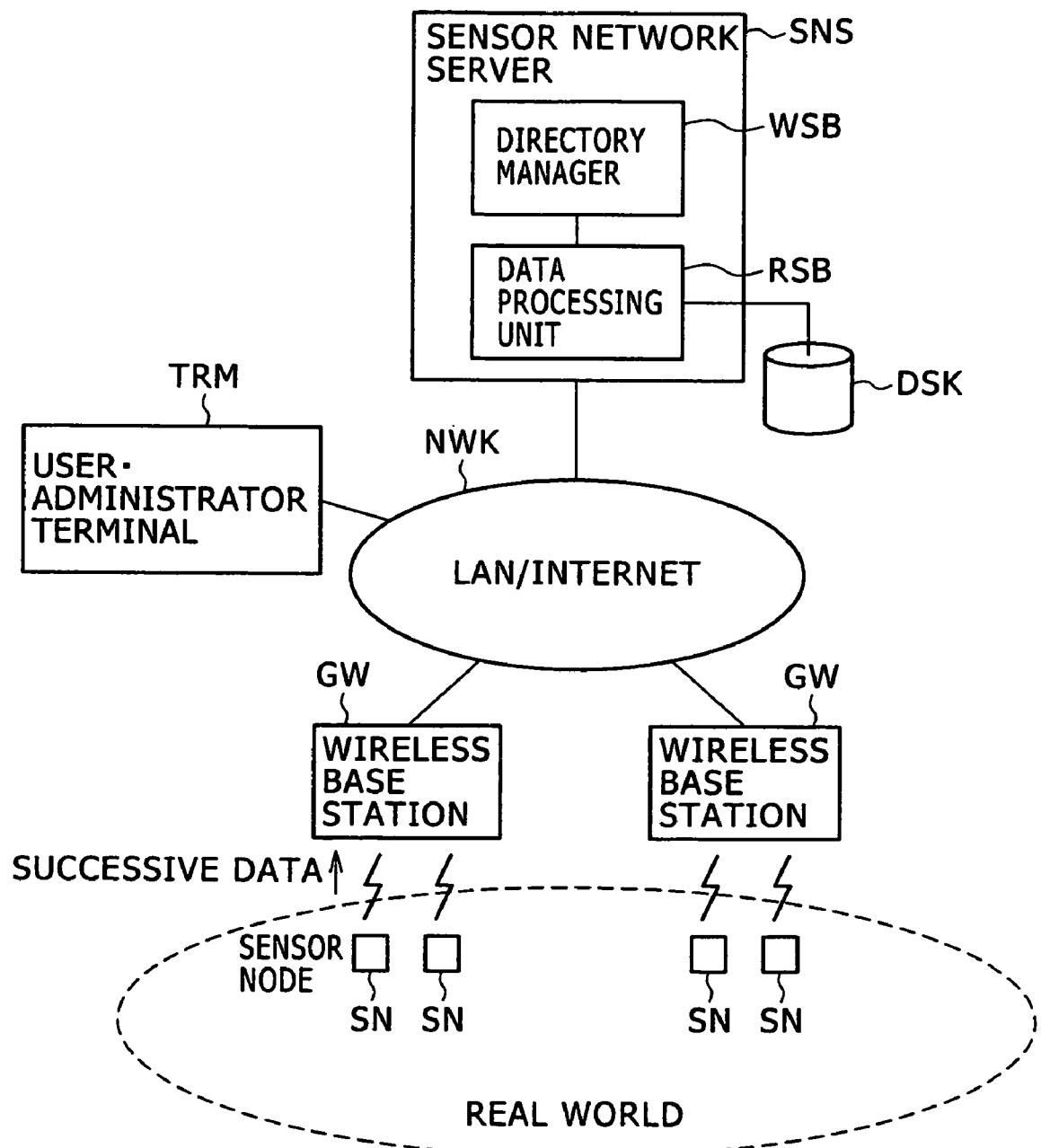
FIG. 1 is a drawing illustrating an example of the system configuration of a sensor network that performs centralized data management.
Figure 2:
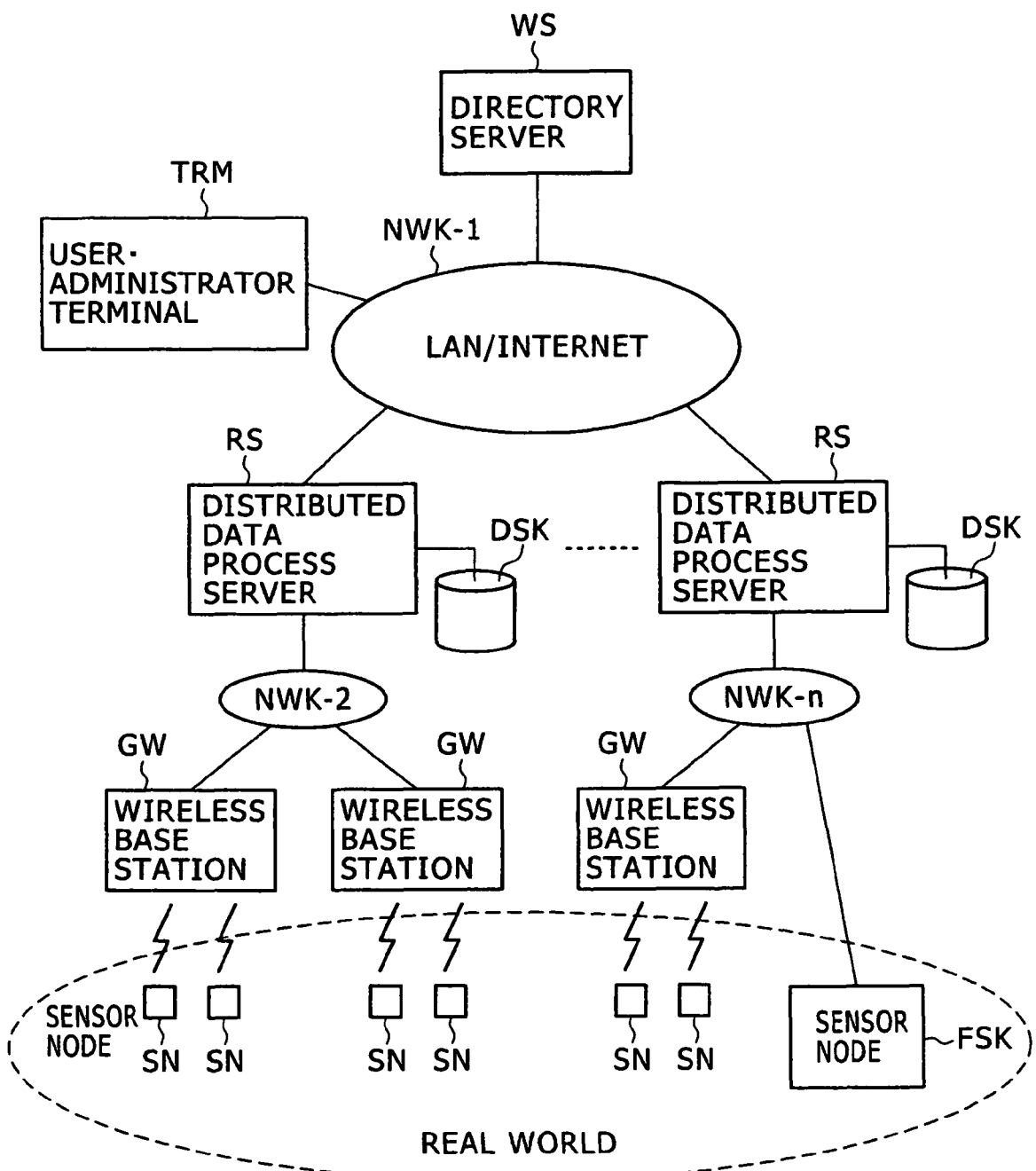
FIG. 2 is a drawing illustrating an example of the system configuration of a sensor network that performs distributed data management.

On the other hand, the system of the sensor network is different in that a data source is closely related to the real world. FIGS. 1 and 2 show examples of the configuration of a sensor network system applied to the invention.

<Outline of System Configuration>

First, the outline of the system configuration will be described below. Examples of the sensor network system include a centralized data processing type of sensor network system (FIG. 1) and a distributed data processing type of sensor network system (FIG. 2). Here, in the case of the centralized data process type, process/management of data transmitted from sensor nodes is performed by the single sensor network server SNS in the system, and in the case of the distributed data processing type, basic process/management of sensor data is performed by distributed data processing servers RS distributed on the network.

A sensor node SN is provided at a predetermined location or to a predetermined thing or person, and collects information on the environment and/or information on the thing provided with the sensor node, and transmits the information to a wireless base station GW.

Each wireless base station GW may receive data from one or more sensor nodes SN. Further, a sensor node FSN that transmits sensing information through wire line without passing it through a wireless base station may be utilized.

In the case of the centralized data processing type, as shown in FIG. 1, data received by individual wireless base stations GW from individual sensor nodes SN through the network NWK are collected and managed by a sensor network server SNS.

In the case of the distributed data processing type, as shown in FIG. 2, some individual wireless base stations GW are connected to a distributed data processing server RS through a network NWK-2. The maximum number of wireless base stations, which can be connected to a distributed data processing server RS, depends on the system scale.

Each distributed data processing server RS or a data processing unit RSB of the sensor network server SNS includes a disk device DSK for storing, for example, data detected by wireless or wire-lined sensor nodes (hereinafter, referred to as sensor nodes), a CPU, and a memory (not shown), and executes a predetermined program. When the predetermined program is executed, measured data from sensor nodes are collected, various processes such as data storing, data processing, notification or data transmission to another server (including a directory server WS in the case of the distributed data process type), etc. are performed according to predetermined conditions, which will be described below.

The network NWK-1 is connected to a user-administrator terminal TRM which performs setting and managing of the sensor network using sensing information.

Here, a sensing data transmitted from a sensor node has a unique ID for identifying the sensor node and sensed numerical data, and the numerical data change in the time series. However, this type of sensing data is not easily understood by users. In contrast to the above, a directory unit WSB of the sensor network server SNS (in the case of the centralized data process type) or the directory server WS (in the case of the distributed data process type) retains the relations between output data of sensor nodes and real world models (human beings, things, states, etc.), which is understandable for users. The users can use the relations to access measured data stored in the data processing unit RSB (in the case of the centralized data process type) or the disk device DSK of the distributed data processing server RS (in the case of the distributed data process type), which can be in an easily understandable form.

Figure 4:
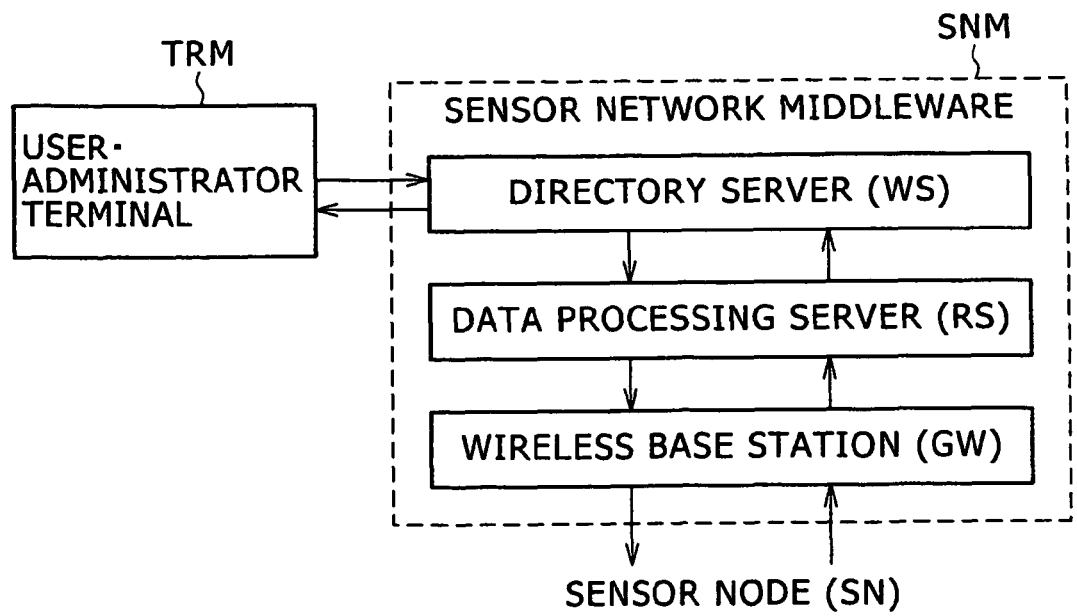
FIG. 4 is a drawing illustrating the logical structure of middleware for realizing the functions of the sensor network system.

FIG. 4 is a drawing illustrating the logical structure of middleware SNM for realizing the functions of the sensor network system. The middleware SNM is composed by a directory server (WS) function, a data processing server (RS) function, and a wireless base station (GW) function.

Figure 5:
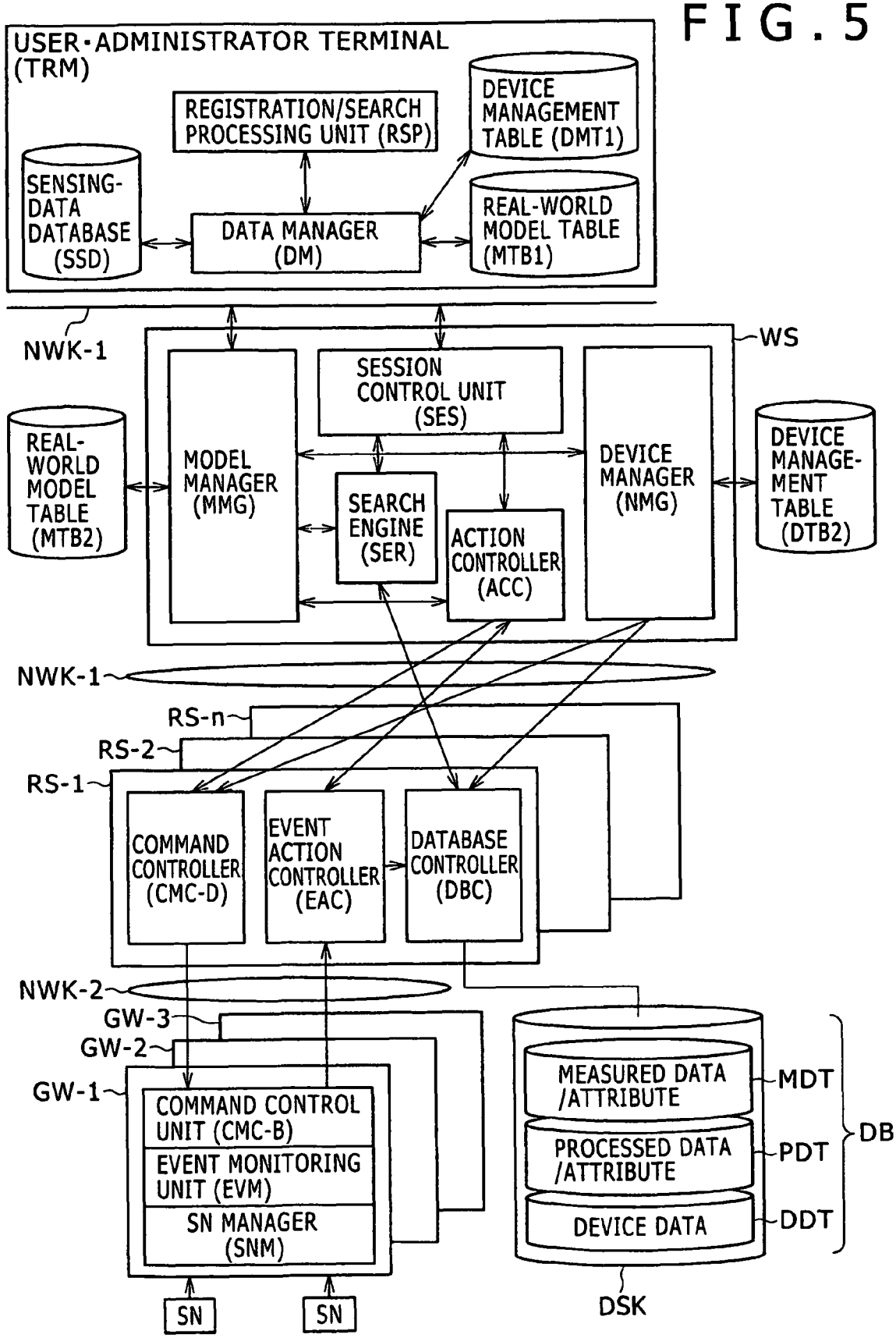
FIG. 5 is a block diagram illustrating the functions of the distributed data process type of sensor network in detail.

FIG. 5 is a block diagram illustrating the functions of the distributed data process type of sensor network in detail. Each of the blocks will be described below in detail.

<Wireless Base Station GW>

A wireless base station GW receiving sensing data from sensor nodes SN includes the following components. A command controller CMC-B communicates with a command controller in the distributed data processing server RS for command transmission and reception. Further, the command controller CMC-B transmits to and receives from sensor nodes commands, such as a command for changing output-timing set.

The sensor node manager SNM manages states of sensor nodes (an operating state, remaining power, etc.).

An event monitoring unit EVM detects a failure of a sensor node or abnormal data from a sensor node, and notifies the detection results to the sensor node manager SNM. Further, a sensor node transmits, measured data, having ID that a wireless base station GW can easily identify, to the wireless base station GW.

<Distributed Data Processing Server RS>

A distributed data processing server RS has the following configuration.

A command controller CMC-D communicates with a wireless base station GW and a directory server WS (which will be described below) to transmit and receive commands and so on.

Whenever measured data from a sensor node is received from a wireless base station GW, an event action controller EAC acquires a data ID included in the measured data, reads generation rules of an event corresponding to the ID of the sensor node, and determines whether an event should be generated.

Further, the event action controller EAC performs an action corresponding to generation of an event corresponding to the data ID. The contents of the specific action performance include a process of converting the measured data into processed data, a process of storing the measured data and the processed data in a database DB through a database controller DBC, a process of performing notification to another server or directory server WS, etc.

The disk device DSK stores, in the database DB, measured data of a sensor node SN received from a wireless base station GW, processed data acquired by processing the measured data, and device data on the wireless base station GW, the wireless sensor node SN, and a wire-lined sensor node FSN.

A database controller DBC stores measured data MDT, which are the output of the sensor node transmitted from the event action controller EAC, in the database DB. Further, if necessary, data acquired by performing numeric process on the measured data MDT, or processed data PDT acquired by fusing the measured data MDT with other data (for example, calculating a discomfort index from temperature data and humidity data) may be stored in the database DB. Furthermore, device data (for example, set information of a network address or the ID of a sensor node SN or a wireless base station GW) may be updated according to a request from the user-administrator terminal TRM, etc.

<Directory Sever WS>

The directory server WS includes the following components.

A model manager MMG uses a real world model list set in a real world model table MTB2 in order to manage the relations between real world models (objects) that the user can easily understand, and processed data or measured data which the distributed data processing server RS collects from the sensor nodes SN.

The directory server WS manages measured data corresponding to a real world model or location information on processed data (such as the IP address of the distributed data processing server RS). In other words, the user can access measured data of a sensor node constantly changing by designating a real world model. Further, real world models are stored in the real world model table MTB2.

On the basis of an object search request received by a session controller SES, a search engine SER searches the database controller DBC (in the distributed data processing server RS) which is the storage location of the measured data with reference to information of the real world model table MTB2.

A device manager NMG registers information regarding the distributed data processing servers RS, the wireless base stations GW, and the sensor nodes SN in a device management table DMT2, and manages the state of each of the devices or the state of each of the sensor nodes. Further, an interface regarding search of the above-mentioned information is supplied to the user-administrator terminal TRM. The device manager NMG issues management commands such as a reset command, a parameter set command, a data deletion command, a data transmission command, a routine event/action set command, etc.

An action controller ACC in the directory server WS communicates with a command controller CMC-D or an event action controller EAC of each distributed data processing server RS to receive an event action set request from the user-administrator terminal TRM. Then, the action controller ACC analyzes the contents of the received event or action and sets function allocation between the directory server WS and the distributed data processing server RS-1 to RS-n according to the analysis results. Further, one action or event may be involved in the plural distributed data processing servers RS-1 to RS-n as well as one distributed data processing server RS.

<Example of Sensor Node>

Figure 6:
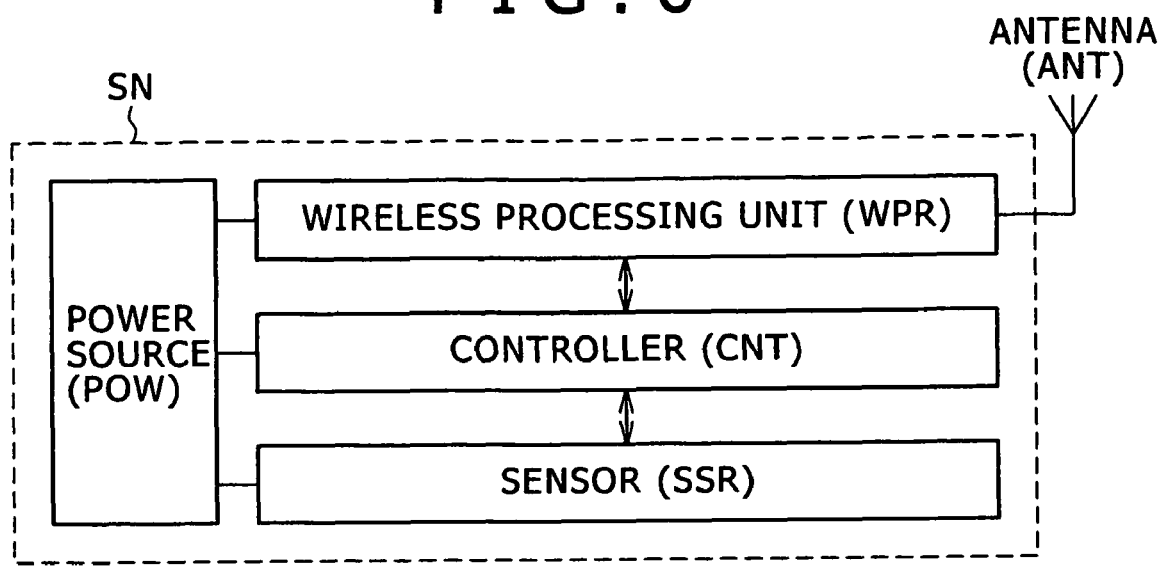
FIG. 6 is a block diagram illustrating an example of a wireless sensor node.
Figure 7:
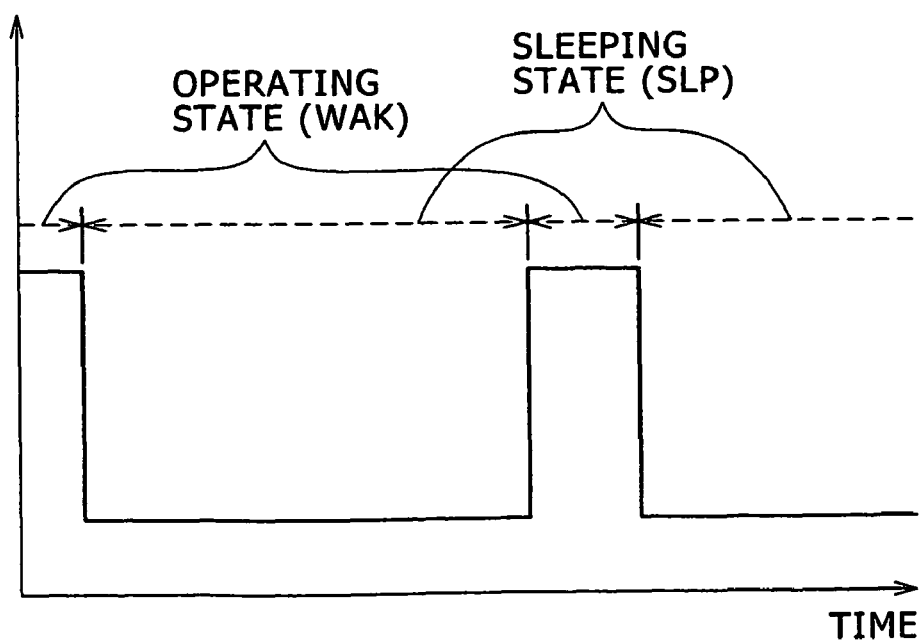
FIG. 7 is a drawing illustrating an example of the relationship between time and current consumption according to an operation state of a wireless sensor node.

The configuration and operational timing of a sensor node are shown in FIGS. 6 and 7.

FIG. 6 is a block diagram illustrating an example of a wireless sensor node SN. The wireless sensor node SN includes a sensor SSR for measuring a state quantity (a temperature, a pressure, a location, etc.) of a measuring object or a state amount of a change in the state quantity (a low temperature/a high temperature, a low pressure/a high pressure, etc.), a controller CNT for controlling the sensor SSR, a wireless process unit WPR for performing communication with a base station BST, a power source POW for supplying power to each of the blocks SSR, CNT, and WPR, and an antenna ANT for performing signal transmission and reception.

The controller CNT reads measured data of the sensor SSR periodically or irregularly, adds an ID of the sensor node set in advance to the measured data, and transmits them to the wireless process unit WPR. Time stamp may be added to the measured data to record the time when sensing was performed.

The wireless processing unit WPR transmits the data from the controller CNT to a wireless base station GW.

Further, the wireless processing unit WPR transmits commands received from a wireless base station GW and so on to the controller CNT, and the controller CNT analyzes the received commands and performs predetermined processes (for example, configuration change, etc.).

The controller CNT monitors the remaining power (or an amount of charge) of the power source PWO. If the remaining power is lower than the threshold value set in advance, the controller transmits warning from the wireless process unit WPR to the wireless base station GW.

The wireless processing unit WPR performs measurement for a long time with limited power by intermittently operating the SN, as shown in FIG. 7, thereby reducing power consumption. In FIG. 7, the controller CNT stops the operation of the sensor SSR in a sleeping state SLP, and switches the sleeping state to an operating state at a predetermined timing, thereby driving the sensor SSR to transmit measured data.

Further, the power source POW may include a battery, or an autonomous power generating mechanism such as a solar battery, a vibration power generation mechanism, etc.

Figure 8:
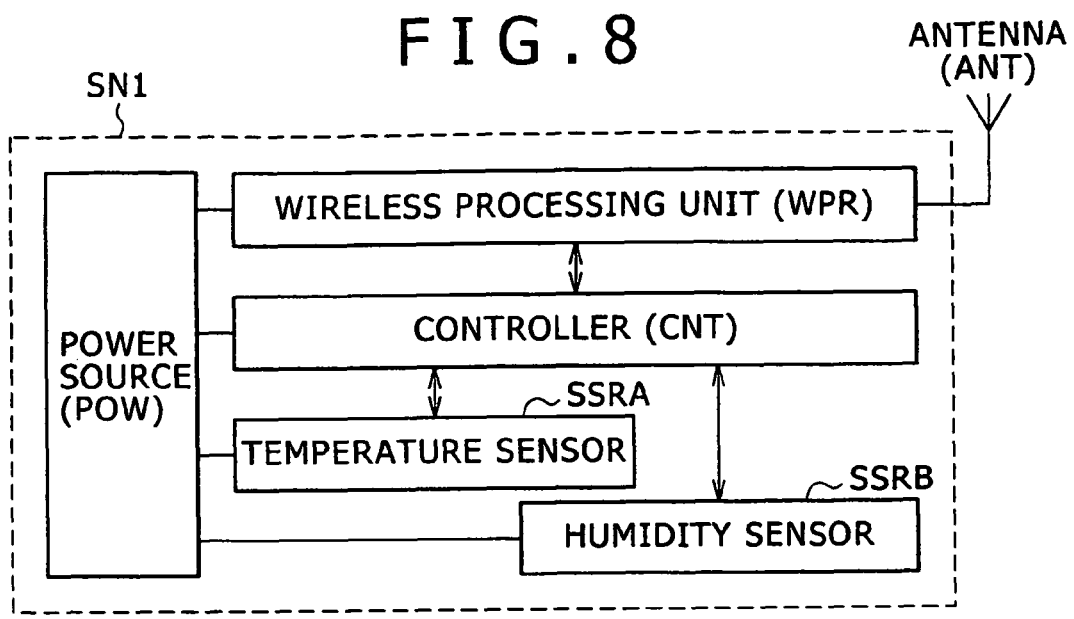
FIG. 8 is a block diagram illustrating an example of a wireless sensor node including plural sensors.

In FIG. 6, an example in which one wireless sensor node SN includes one sensor SSR is shown. However, one sensor node may include two or more sensors, for example, a temperature sensor SSRA and a humidity sensor SSRB, as shown in FIG. 8.

<User-Administrator Terminal TRM>

The user-administrator terminal TRM includes the following components.

A registration/search processing unit RSP is provided with an interface for registration of real world models or information on devices (sensing nodes SN, wireless base stations GW, and distributed data processing server RS), and search of sensing data by a GUI (graphical user interface).

Here, a real world model generally facilitates the data use of the user by concealing sensing data expressed in numerical and ID information and allocating model names such as locations or names to the sensing data.

A data manager DM receives an instruction from the registration/search processing unit RSP, registers real world models or information on devices (sensing nodes SN, wireless base stations GW, and distributed data processing server RS) to a real world model table MTB1 and a device management table DMT1, respectively, and performs data management such as performing a sensing data search process on a sensing-data database SSD.

Figure 9:
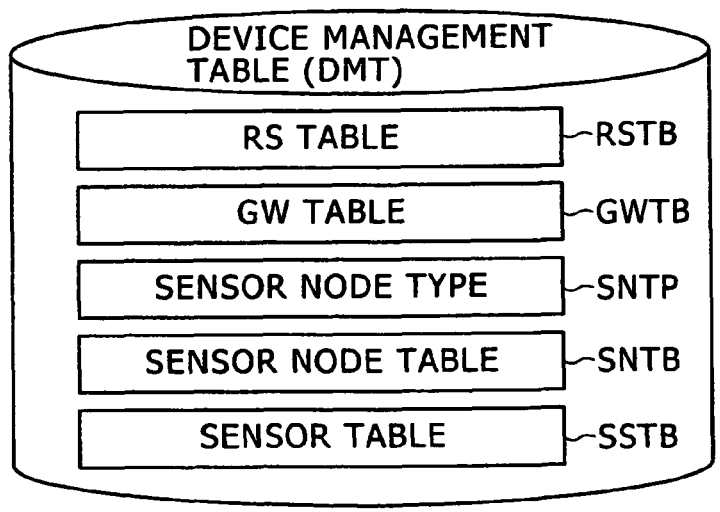
FIG. 9 is a drawing illustrating an example of the structure of a device management table.

Here, the device management table DMT1 includes a sensor table SSTB to perform setting on every sensor, a sensor node table SNTB to perform setting on every sensor node, a sensor node type SNTP for designating the type of each sensor node, a GW table GWTB to perform setting of wireless base stations GW, and a RS table RSTB to perform setting of distributed data processing servers RS), as shown in FIG. 9.

As described above, it is possible to easily add a new sensor node, and a sensor to an existing sensor node, etc. by separately performing the setting of each function hierarchy of the devices. Further, even in the case where a sensor node breaks down and an exchange of the sensor node is needed, it is unnecessary to change model names, instead only the relations between the model names and sensing data needs to be changed. Therefore, the user need not consider physical difference between the sensor nodes.

Further, the RS table RSTB includes a unique ID for device management, a name, an IP address, and a port number for every distributed data processing server RS as components of management information therefore, as shown in FIG. 13.

The GW table GWTB includes, for every wireless base station GW, a unique ID for device management, a name of the corresponding wireless base station, a name of a distributed data processing server RS to which the corresponding wireless base station is connected, an IP address, a port number, wireless transmission and reception power (Power), Radio Channel which represents an identification number of a radio channel, and PAN ID which represents an ID for identifying a wireless network, as components of management information therefor, as shown in FIG. 14.

The sensor node table SNTB includes, for every sensor node SN, a unique ID represented on PAN ID, a name of the corresponding sensor node, a name of a distributed data processing server RS to which the corresponding sensor node is connected, the type of the corresponding sensor node, Global ID which is a unique identification number of a node unit, remaining power information (Battery), a sensing cycle, wireless transmission/reception power (Power), a radio channel, and threshold value information for outputting a warning according to an amount of remaining battery power as components of management information therefor, as shown in FIG. 15. Here, the sensor node type is prepared for distinguishing sensor node types of a temperature/humidity sensor node, a sensor node for health monitor, and etc.

The sensor table SSTB includes, for every sensor (for example, a temperature sensor or a humidity sensor), a unique ID on a system, a name, a name of a sensor node SN on which the corresponding sensor is mounted, the type of sensor node, a sensing cycle, and an upper threshold value and a lower threshold value of sensing values as components of management information therefor, as shown in FIG. 16. The upper threshold value and the lower threshold value of sensing values are used to determine whether a sensing value is abnormal.

Further, a table to manage IDs for identifying the sensor node type used in FIGS. 15 and 16 is included (FIG. 17). As described above, names are allocated to IDs of corresponding sensor node types, which make it possible to easily display the sensor node types of each of the tables of FIGS. 15 and 16.

ID information in the leftmost column of a row of each of the tables shown in FIGS. 13 to 17 is automatically allocated by the system when an entry is added.

<Procedure of Setting Device Information>

Next, a procedure of setting the above-mentioned device information is described.

Setting of the device information is performed through a GUI provided in the registration/search processing unit RSP. A device-information set screen DVSC which is a GUI used to set the device information is shown in FIG. 11.

If a device type on a device type screen DVT of the device-information set screen is selected, a list of a corresponding table is displayed in the device table DVTB. If each of RS, GW, Sensor Node Type, Sensor Node, and Sensor is selected from the device type DVT, the contents of the tables shown in FIGS. 13 to 17 are displayed according to the selected content. These tables are composed of units considering an extension and a reduction as a device. Further, considering a case where plural types of sensing data are generated in one sensor node, sensor-based table management is performed on the sensors of the sensor nodes SN.

Figure 12:
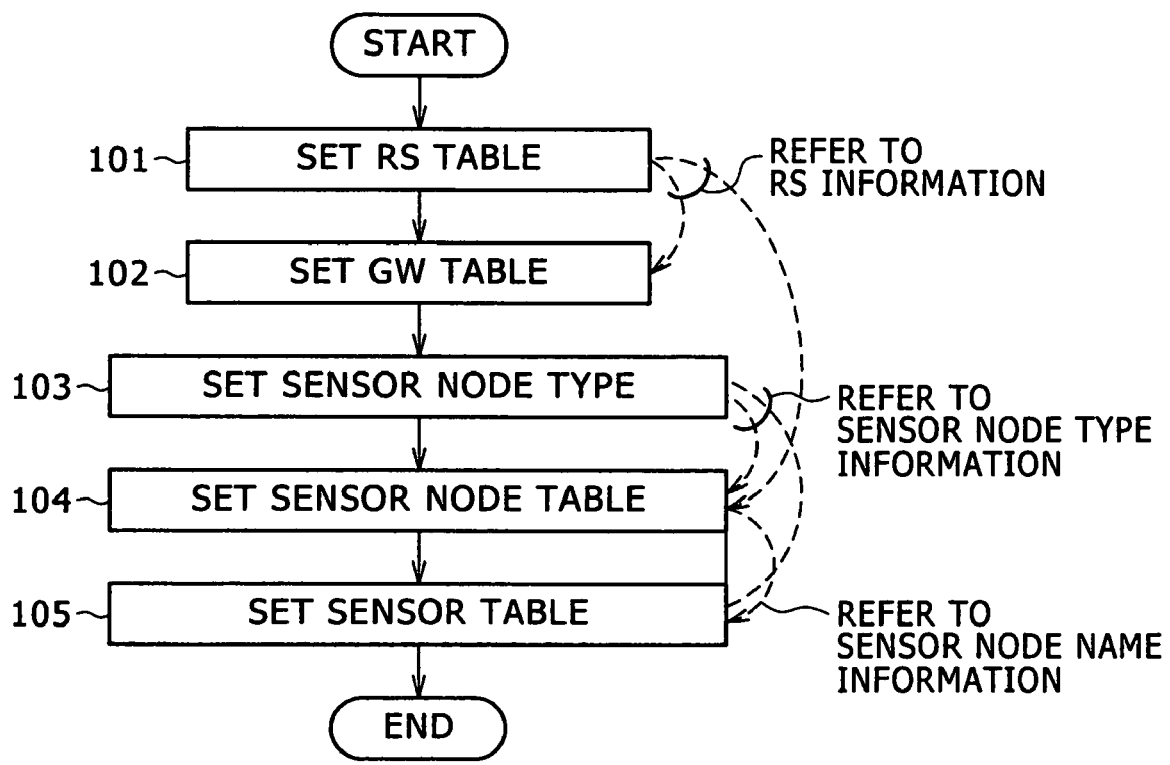
FIG. 12 is a drawing illustrating an example of a device-information set flow.

FIG. 12 is a drawing illustrating a device-information set flow.

First, in step 101, information on distributed data processing server RS is set in the RS table RSTB (FIG. 13).

In the next step 102, information on wireless base stations GW is set in the GW table GWTB. Here, information on which distributed data processing server RS to be connected by each wireless base station GW is set by selecting name information on distributed data processing servers RS registered in step 101 (FIG. 14).

Next, in step 103, the sensor node type SNTP is set as shown in FIG. 17.

In Step 104, a sensor node table SNTB is set. Here, for each sensor node SN, set information, and information on which distributed data processing server RS to be connected thereto, that is, information on which distributed data processing server RS the corresponding sensor node is managed under, are set by selecting type information of the sensor node type SNTP and name information of the RS table RSTB registered in advance (FIG. 15).

Here, if a case where a sensor node SN moves or a change in incoming signal strength is considered, a wireless base station GW which the sensor node SN communicates with for data transmission and reception may be changed. For this reason, in the sensor node table setting according to this embodiment, the relationship between the sensor nodes SN and the wireless base stations GW is not managed.

Finally, in step 105, information on individual sensors is set in the sensor table SSTB. Information on a sensor node SN which each sensor is mounted on and information on the type of corresponding sensor node are set by selecting the type information of the sensor node type SNTP and the name information of the sensor node table SNTB registered in advance (FIG. 16).

The individual devices can be matched with each other according to the above-mentioned steps 101 to 105.

Further, when information that can specify each device is defined as ID information (for instance, the ID, name, or the like of a sensor is defined as sensor ID information), storage address information (IP Address) indicating the location on the network where sensing data is stored and distributed data processing server ID information are registered in association with each other, the distributed data processing server ID information and sensor node ID information are registered in association with each other, and the sensor node ID information and sensor ID information are registered in association with each other. In other words, it is possible to match the sensor ID information and the storage address information with each other, and to define which distributed data processing server RS of the sensor network system manages sensing data uniquely identified.

As described above, device information setting is performed from one, high-ranking in the hierarchy, of devices constructing the sensor network system in consideration of the relations between information, as shown in FIG. 12. In other words, the setting is performed in the order of a distributed data processing server RS, a wireless base station GW, a sensor node SN, and a sensor SS.

In the above-mentioned example, a case in which device information is newly registered has been described. However, even when a device such as a sensor node SN, a wireless base station, etc. is added during service, it is possible to perform setting in the same procedure.

Further, as shown in FIG. 33, it is possible to perform device information setting by specifying set information of various devices in, for example, a CVS file CVSF1 in advance and reading the information from the device information set screen.

<Procedure of Setting Model Type Information>

Figure 19:
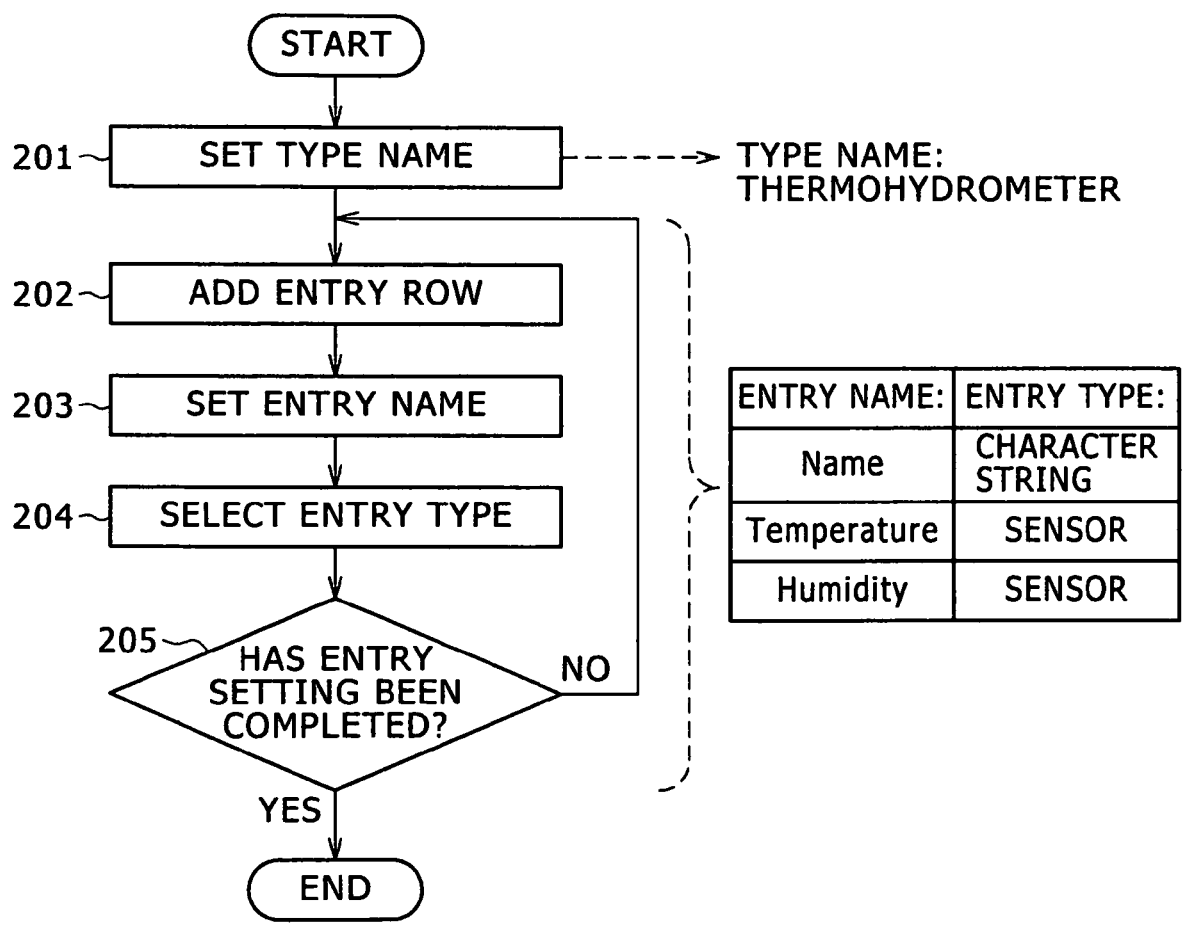
FIG. 19 is a drawing illustrating an example of a model type registration flow.

Next, a procedure of registering model types, which becomes forms of real world models, will be described with reference to FIGS. 18 to 20.

Here, a model type is used to register device information, for example, sensor ID information and names representing the real world, in association with each other. The model type includes a name for identifying the model type and an entry defining information to be displayed, and becomes a frame when the information is displayed. The name is attached to every model type, that is, every information type defined. A user can determine a component constituting a real world model by registering an entry. As a result, convenience is further improved for the user inspecting the sensing data, etc.

Registering of model type information is performed through a GUI supplied in the registration/search processing unit RSP. A model information set screen MDSC, which is the GUI used to register model type information, is shown in FIG. 18. If a name of a model type on the model type screen MDT is selected, a list of corresponding tables is displayed as model data MDD. The model data is acquired by allocating a specific element according to the model type.

A model type registration flow is described with reference to FIG. 19.

First of all, in step 201, a model type name is set. A type name which the user can easily understand, for example, "thermohydrometer" is set as the model type name.

Next, in steps 202 to 205, entry row adding, entry name setting, and entry type selecting are performed.

Here, the entry name represents a name to be allocated to the entry, and the entry type represents the data type of the entry, for example, a character string, a sensor, a sensor node, GW, a model, etc. In an example shown in FIG. 18, for "Thermohydrometer" of the model type MDT, three entry names, which are "Name", "Temperature", and "Humidity", are registered. Further, shown in FIG. 19 as an example in which three entry rows, that is, "Entry name: Name, Entry type: character string", "Entry name: Temperature, Entry type: Sensor", and "Entry name: Humidity, Entry type: Sensor" are set.

Specifically, setting of that information is performed on a popup screen MDPP for newly adding a model type shown in FIG. 20. A model type name is input to a model type name input field MTN, and an entry row is added by an entry addition button. Then, inputting to an entry name ENN and selecting of an entry type ENT corresponding thereto are performed. It is possible to add the necessary number of entry rows to include, for example, additional attribute information for a corresponding model.

Figure 31:
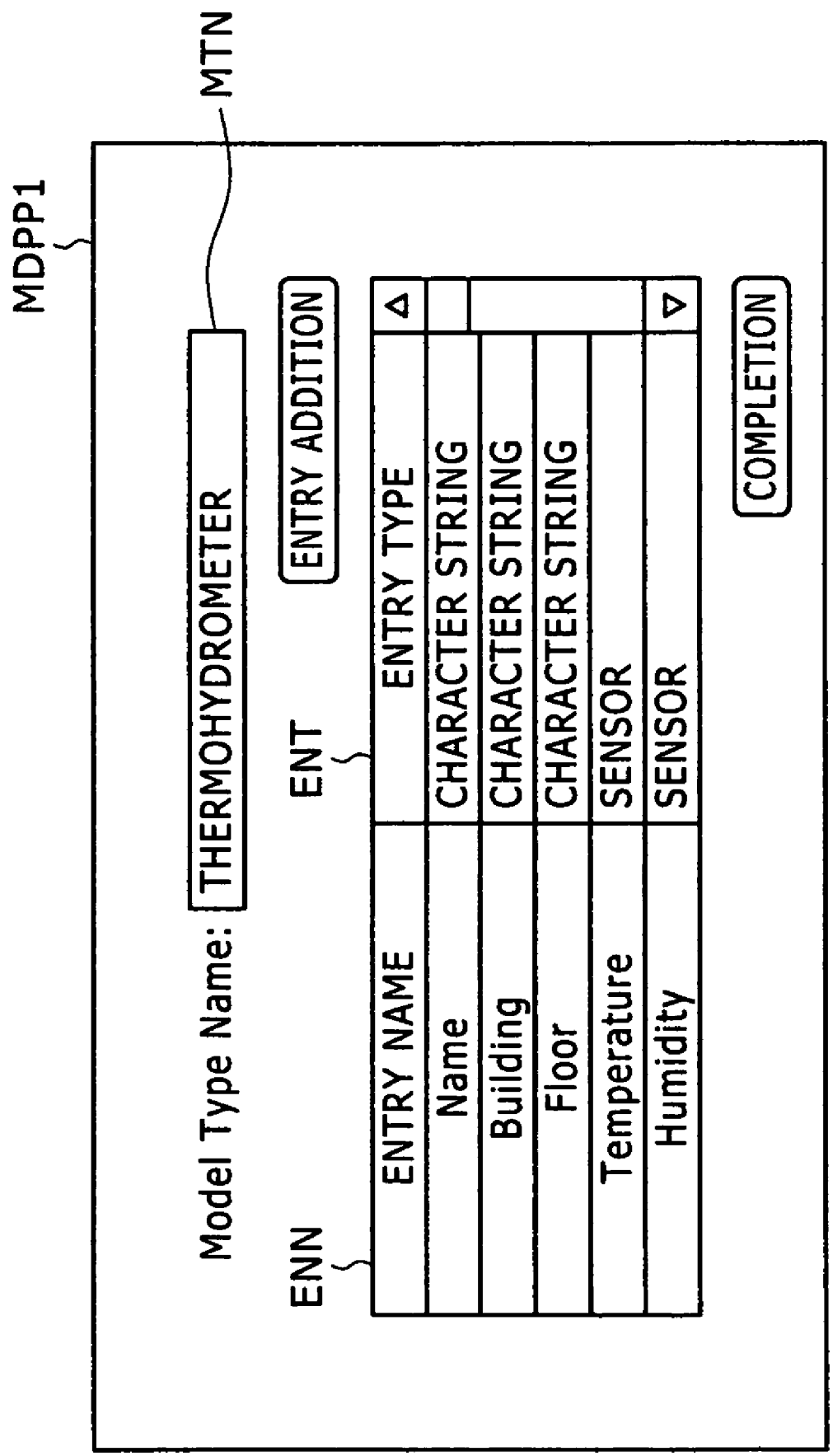
FIG. 31 is a drawing illustrating an example of a screen for newly adding a model type.

For example, FIG. 31 shows an example in which two attributes having entry names "Building" and "Floor" are added to the set example shown in FIG. 20. After the necessary entry addition is performed (step 205), the model type registration flow is ended.

FIG. 35 shows a model type table generated according to the above-mentioned procedure. The model type table is composed of model type name MTN, entry name ENN, and entry type ENT as described above.

A frame which manages data is decided by setting the entry in advance. The user can perform data addition or deletion by a handy operation by performing direct input to entry fields. Further, since information that should be input for each type according to the frame is specified, consistent data adjustment becomes possible.

<Procedure of Setting Real world Model Information>

Finally, a procedure of registering a real world model is described with reference to FIGS. 21 and 22. In FIG. 21, a model registration screen MDSC is shown. The registration procedure is described with reference to a model registration flow shown in FIG. 22.

First, in step 301, a model type MDT is selected.

Next, in step 302, if a new model registration menu is selected, a blank row corresponding to model data MDD is added. The selection of the new model registration menu is achieved by a right click etc., though not shown in FIG. 21. When a new model is registered, a model ID is automatically allocated.

There are two kinds of other entries as shown in steps 303 to 305.

When the entry type is a character string, the user can directly input the name, which is identifiable according to usage environment. As the name representing the real world, information representing, for example, an object which a sensor senses, that is, a person, a thing, a location, or a place where a sensor is disposed, or an organization name of an enterprise in which the thing or the person belongs, or the purpose to perform sensing such as project A or experiment A can be freely set in a comprehensible form for the user. For example, thermohydrometer of conference room A, rooftop thermohydrometer, etc. are set as model names in FIG. 23. As a result, the user can easily manage data.

When the entry type is not a character string, that is, when the entry type is a sensor node or a sensor described above, one is selected from data registered in the device information. The data registered in the selected device information can change information to be displayed according to the user's usage.

Figure 23:
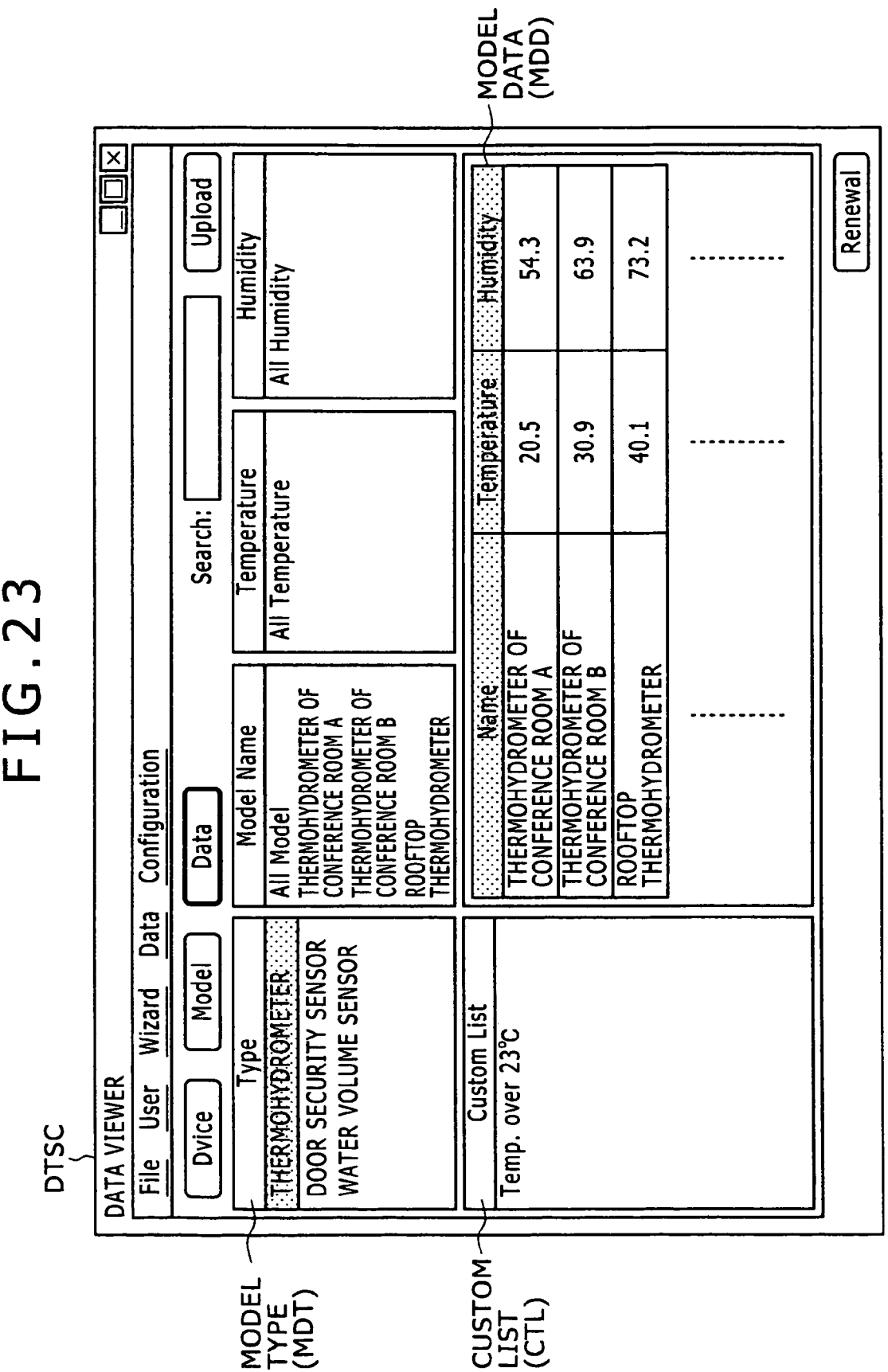
FIG. 23 is a drawing illustrating an example of a data viewer.

For instance, when a sensor is set as the entry type as shown in FIG. 21, the user sets a sensor name such as SE1 or SE2 as sensor ID information. When the user inspects sensing data acquired by the sensor, it is possible to perform setting so that data is converted into specific numeric data and is then displayed. In other words, as shown in FIG. 23, the temperature or humidity acquired by the sensor of the thermohydrometer of the conference room A is displayed as a specific numeric value.

Moreover, when the user wants to manage the installation place of each sensor, it is also possible to display it as the sensor name, not as a specific numeric value.

Similarly, when any one of the sensor nodes, GW, etc. that are devices other than the sensor are set as the entry type, the user can manage the installation place of the sensor node and the correspondence relationship between devices by displaying the name of the device (ID information) as it is.

Further, when the model is selected in the entry type, the user sets the model, which has already been set. As a result, the user can manage model information by the model name and easily identify and manage information set in the model information.

In addition, device ID information such as the sensor name, etc. may be set so that a sensor node installer and a sensor network system manager can easily comprehend the information when device information is set. As a result, even though an installer and a manager are different from each other, it is possible to smoothly perform sensor management.

When the addition of a necessary model and setting of an entry corresponding thereto are completed (step 306), the model registration flow is ended.

Managing matching of the real world and the device information, for example, matching of a name representing the real world and the sensor ID information, matching of an IP address and a name representing the real world through the sensor ID information, etc., becomes possible by registering the above-mentioned real world model information.

<Device/Model Set Flow>

FIG. 27 shows a sequence chart where device information and the model information which the manager sets from the user-administrator terminal TRM are reflected in various devices (WS, RS, and GW) of the sensor network system.

If the manager performs a WS transmission instruction after performing setting to the device management table DMT1 and the real world model table MTB1 (an upload button UPLOAD is pressed on the individual set screens), that information are transmitted to the real world model table MTB2 and the device management table DMT2 of WS.

Then, only device information is transmitted from WS to the device data DDT in DB of RS and registered, and information (GWTB) relating to GW is transmitted to GW and is registered therein.

Here, the device information transmitted from WS to RS is not the entire device management table DMT2, but only information regarding each RS, that is, the device information table concerning the sensor node or GW matched with each RS is selectively transmitted. The selectively transmitted device information is defined as related device information. As a result, the memory capacity of RS can be efficiently used.

Figure 28:
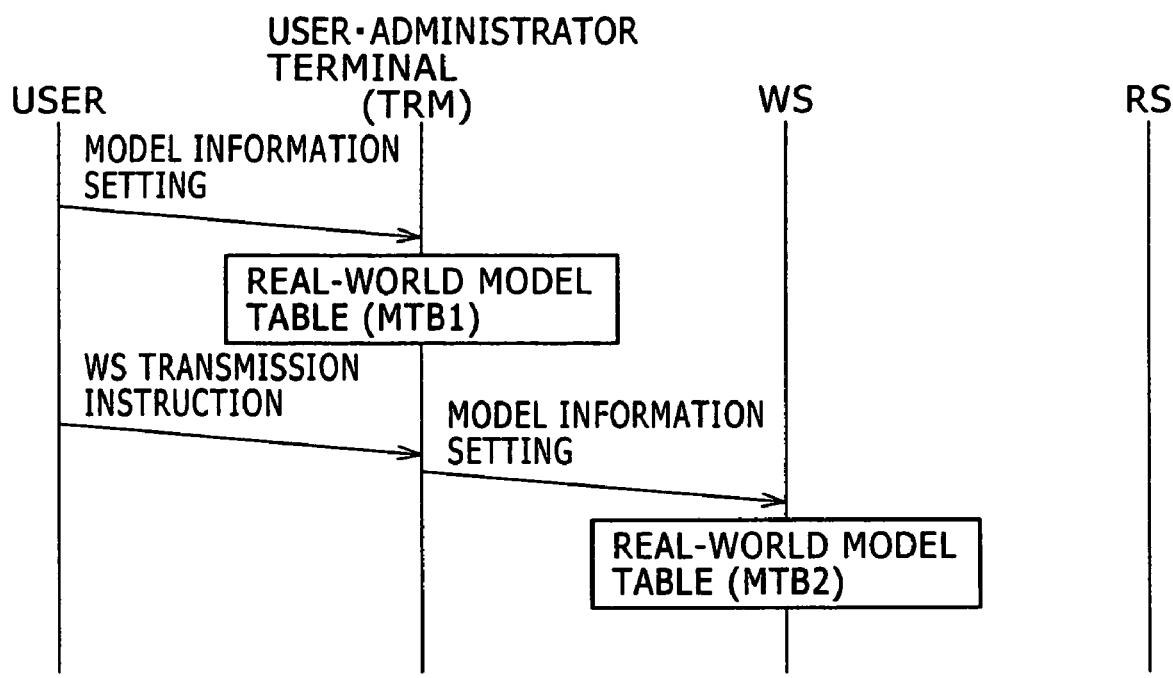
FIG. 28 is a drawing illustrating an example of a model set flow.

Further, an example when the user (or manager) sets the real world model information with respect to the device information that has already been set is shown in FIG. 28. In this example, a WS transmission instruction may be performed with respect to information of the real world model table MTB1 set from the user-administrator terminal TRM (an upload button is pressed on the set screen). This information is transmitted to real world model table MTB1 of WS.

Furthermore, setting to the device management table DMT1 and the real world model table MTB1 can be performed once by describing, in advance, set information of various devices as shown in FIG. 33 and the model set information and set information of various devices as shown in FIG. 34 in, for example, a CVS file (CVSF1 or CVSF2), and reading that information. Then, the method of performing WS transmission can be adopted. In this method, two or more device settings can be described on the single file in this method. Therefore, the method is effective when a large amount of sensor node information is initially set at once.

In addition, after the device management table DMT1 set with the user-administrator terminal TRM is reflected in various devices (WS, RS, and GW), TRM need not necessarily retain the device management table. When the user resets the device information, the resetting can be performed by reading the device management table DMT2 registered in WS.

<Data Inspection>

FIGS. 23 to 24 show a data inspection example. The data inspection is performed through the GUI provided in the registration/search processing unit RSP. FIG. 23 shows a data viewer DTSC. If the model type is selected on model type MDT of this screen, the list of a corresponding model is displayed as model data MDD.

In the example shown in FIG. 23, three models registered according to the model type of FIG. 18 are displayed. Here, the model names which represent objects performing sensing are a thermohydrometer of a conference room A, a thermohydrometer of a conference room B, and a rooftop thermohydrometer.

Thus, it is possible to supply information so that users can easily comprehend the information by performing search and inspection of sensing data by using the model name instead of the device information comprising an ID and numeric value.

Further, if the observed value changes, the entry is updated. As for the update, the measured data MDT stored in DB is polled regularly or manually, or data is pushed to the user-administrator terminal at a timing when the observed data from the sensor changes by use of the mechanism of the event action controller EAC. Thus, the user can acquire the latest sensing data at a desired timing.

Figure 30:
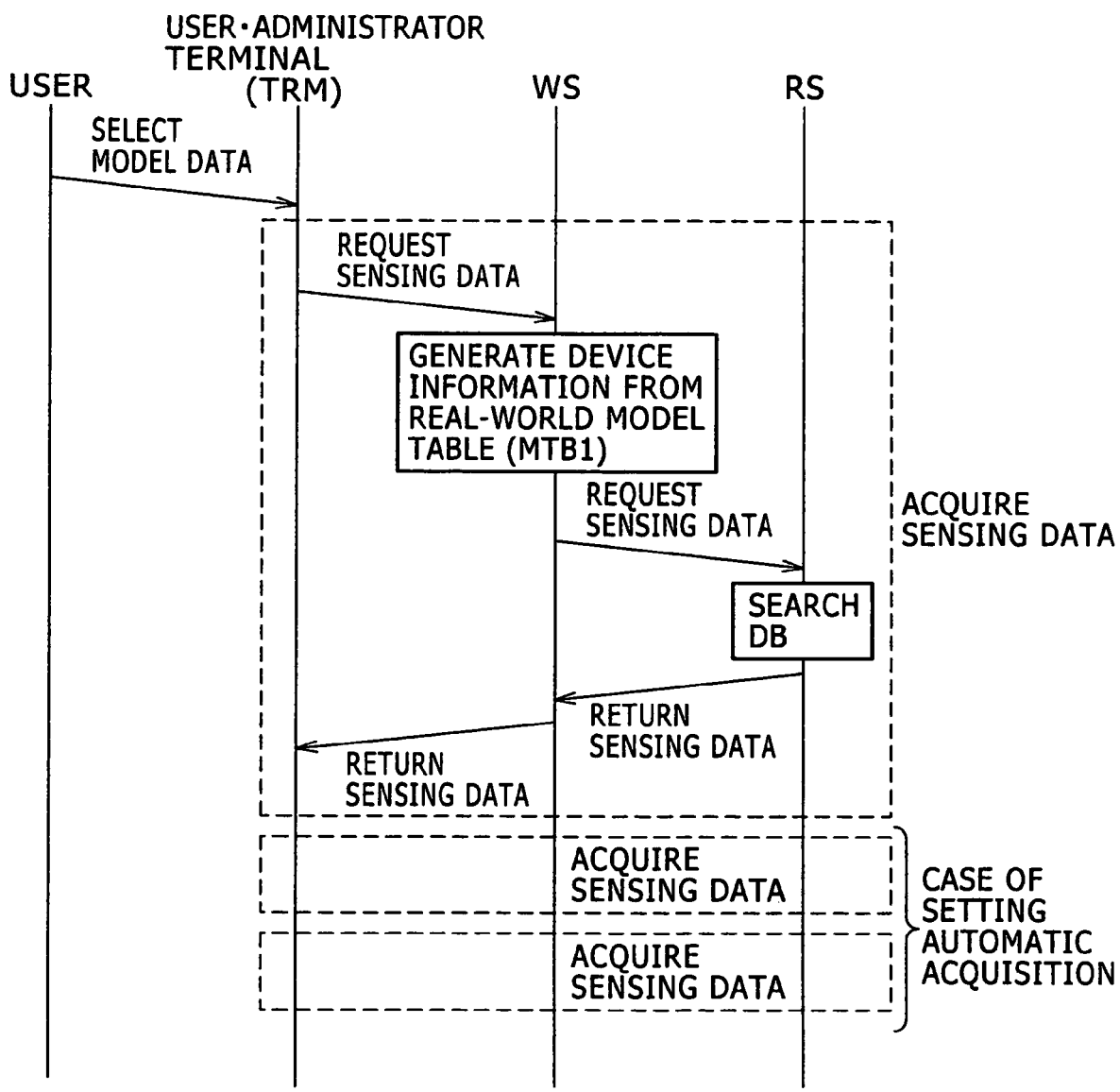
FIG. 30 is a drawing illustrating an example of a sensing data request flow.

FIG. 30 shows a flow chart according to which the user acquires the sensing data stored in DB of RS.

Figure 10:
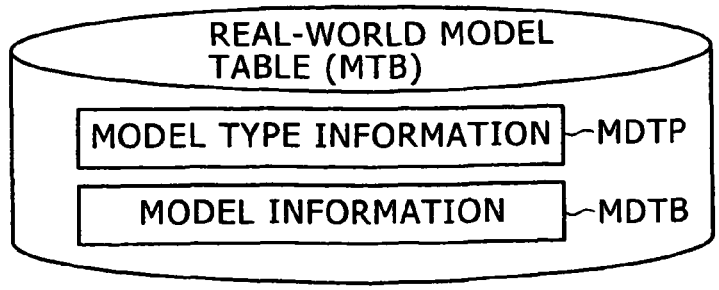
FIG. 10 is a drawing illustrating an example of the structure of a real world model table.

If the user selects the model data through the user-administrator terminal TRM, a data acquisition request is issued to WS. In WS, corresponding device information is searched from the real world model table MTB1, and the sensing data is searched for DB in RS. Specifically, first, a corresponding sensor name SE is acquired from the model data MDD stored in the model information MDTB of the real world model table MTB (FIG. 10). Next, RS information, where desired data matched with the sensor with the acquired sensor name is stored, is acquired by using the sensor table SSTB and the sensor node table SNTB. In addition, the IP address and the port number of the correspondence RS are acquired from the RS table (RSTB).

WS transmits a sensing data request of RS on the basis of the acquired RS information and sensor ID information. RS that receives the request searches DB for sensing data of a corresponding sensor node, and transmits the searched data to the user-administrator terminal TRM through WS. The sensing data transmitted to the user-administrator terminal TRM is displayed on a display screen as a specific numeric value in the real world in association with the name that shows the real world.

When the latest sensing data in the user-administrator terminal TRM is acquired automatically, measured data MDT regularly stored in DB is regularly polled and acquired according to the above-mentioned procedure.

Figure 29:
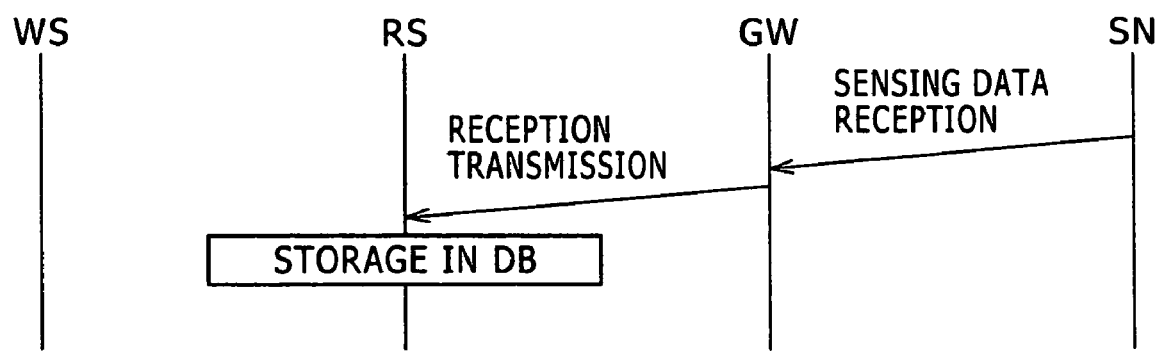
FIG. 29 is a drawing illustrating an example of a sensing data storage flow.

The sensing data generated from the sensor node SN is regularly or irregularly stored in DB in the corresponding RS. Moreover, two or more sensing data items stored in DB of each RS can be identified for each sensor (FIG. 29).

A wireless base station GW having received the sensing data from the sensor node SN can see RS and IP address to which data should be transmitted, due to information of the RS table RSTB and the GW table GWTB (FIG. 13 and FIG. 14).

By selecting only a specific model from the model name list, only the corresponding model data can be selectively displayed on the data viewer. In particular, when the number of registered models is large, since the display is not controlled within one screen, it is preferable to simply sort and display only the models to be displayed as shown in FIG. 24. It is possible to selectively display only the data of user's interest object by such a sorting function.

An example in which data is sorted by using a custom list CTL is shown in FIG. 24. The custom list enables the user to freely make the display condition of data, and thus only the model data satisfying this condition can be selectively displayed. For instance, in FIG. 24, "Temperature of 23 degrees or more" is set in the custom list. If the user selects the set custom list, the model data satisfying the condition, that is, only the thermohydrometer of the conference room A is displayed.

Figure 32:
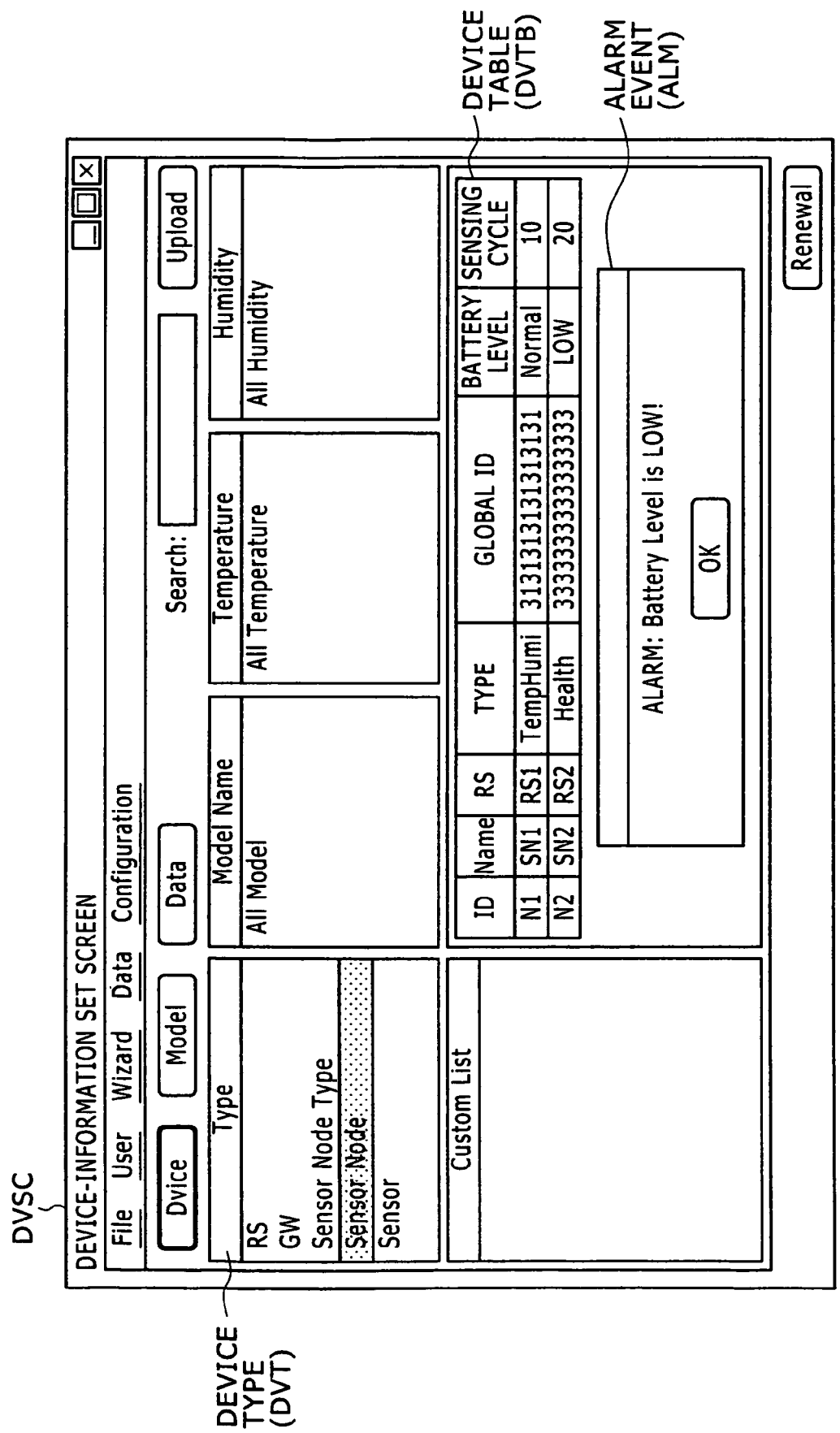
FIG. 32 is a drawing illustrating an example of a device information set screen on which alarm notification is performed.

FIG. 32 shows an example of the function to display an alarm event ALM notified from a sensor node SN when a battery level is low on the device information setting screen.

In the device type (DVT), the list of each device is displayed in the device table DVTB by selecting a corresponding device type. In particular, if the power supply from a battery is interrupted, a sensor node cannot transmit and receive data. In order to prevent this problem, when the user-administrator terminal TRM receives information that the remaining power of the battery is low from any one of the sensor nodes, an alarm event ALM is displayed on the popup screen.

It is possible to quickly see a sensor node corresponding to a low battery power due to that function, without monitoring all sensor nodes SN. Moreover, it is also possible to specify the sensor node with a low battery power if data is sorted on the basis of the battery level by the custom list.

Thus, the user can use the data of the sensor network which can be understood easily by defining the real world model type, and expressing sensing information obtained from the sensor network system in the form of model data that corresponds to the real world. Moreover, it is possible to easily display only object data desired by the user and to easily access data by managing a lot of model data in the list form, and selecting only data satisfying the condition set in the custom list.

Second Embodiment

Figure 25:
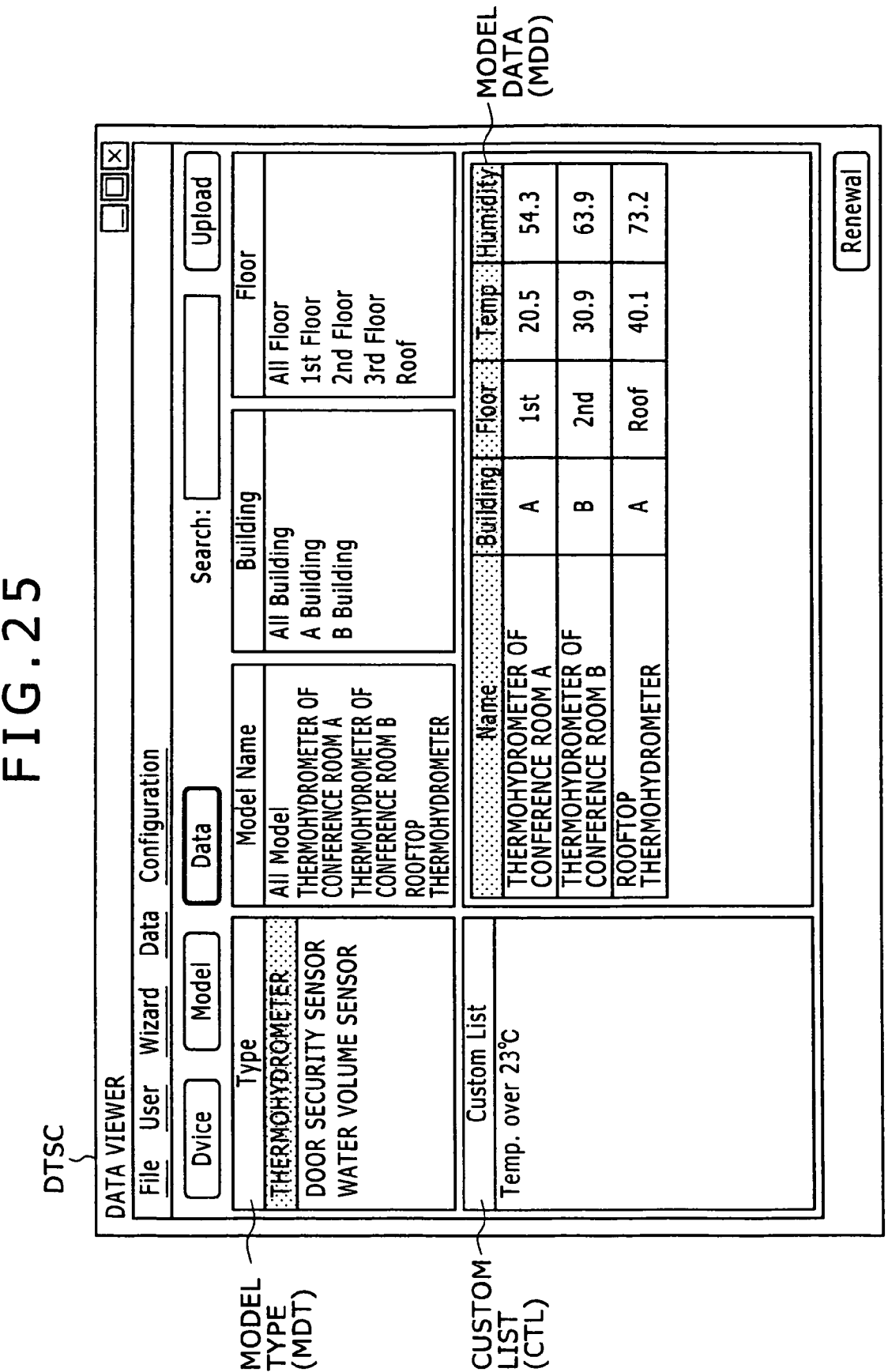
FIG. 25 is a drawing illustrating an example of a data viewer.

Next, another example of the data inspection is shown in FIGS. 25 to 26.

In FIG. 25, three models registered according to the model type shown in FIG. 31 are displayed. Building and floor entries (types of which are a character string) are added to the entries of FIG. 23. As a result, the names of the building and the floor where the sensor is disposed can be set. In addition, the number of persons to be accommodated in each room, and an address representing the disposed place, etc. can be set as attribute information.

Thus, the selection of data to be displayed from among a lot of model data is facilitated by providing attribute information to additionally describe the made model. For example, as shown in FIG. 26, by selecting the condition of the first floor and the building of the name of A on the selection screen of the building name and the floor name, only data (thermohydrometer of the conference room A) satisfying that condition can be displayed from among all the model data.

Particularly, it is assumed that there are a lot of usage methods of placing a lot of sensors spatially and managing sensing data thereof in a sensor network. Therefore, it is possible to remarkably improve the accessibility to desired data by providing plural attribute information items to identify a spatial hierarchy to the model data in advance, and sorting data by using them as a key.

The main effects achieved by the embodiment of the invention are as follows.

According to the embodiment of the invention, construction and setting of the sensor network system can be performed flexibly and easily. Moreover, the accessibility to data successively input in the sensor network can be remarkably improved.

The processing flow in this embodiment can be realized as a program, and each controller and each manager can perform a process by reading the program with the computer.

Although the embodiments of the invention have been described, the invention is not limited to the above-mentioned embodiments. Those skilled in the art will appreciate that the invention can be variously modified and embodiments mentioned above can be combined arbitrarily above.

The present invention is used so that the user may easily access sensing data generated from plural sensors connected to a network.

What is claimed is:

1. A sensor network system for managing sensing data acquired by a sensor, the sensor network system comprising:
    a first server including a first controller and a first manager that includes a name representing a real world entity, the first manager managing matching between storage address information representing a location where the sensing data is stored and sensor ID information of the sensor and matching between the sensor ID information and the name representing the real world entity; and
    a second server connected to a sensor node having the sensor, the second server including a storage unit storing the sensing data and the storage address information; and
    wherein the first controller outputs the name representing the real world entity and output sensing data corresponding to the name representing the real world entity, and
    wherein the output sensing data is read from the location represented by the storage address information matched with the name representing the real world entity through the sensing ID information by the first manager.

2. The sensor network system of claim 1, wherein the name representing the real world entity represents at least one of a location, a thing, and a person on which the sensor is placed.

3. The sensor network system of claim 1, wherein the first manager manages matching between the storage address information and the sensor ID information by managing matching of the storage address information and server ID information of the second server, matching of the server ID information and sensor node ID information of the sensor node, and matching between the sensor node ID information and the sensor ID information.

4. The sensor network system of claim 3, further comprising:
a client terminal;
wherein the client terminal includes an input unit, a second manager managing device information including at least the sensor ID information, the sensor node ID information, the server ID information input through the input unit, and a second controller outputting the managed device information to the first server,
the first manager manages the output device information, and
the first controller outputs related device information selected from the device information managed by the first manager to the second server, and the second server manages the output related device information.

5. The sensor network system of claim 3, wherein the first server and the second server are the same device.

6. The sensor network system of claim 1, wherein the first manager registers a model type to register the sensor ID information and the name representing the real world entity, the model type includes a name for identifying the model type and an entry for defining information representing the model type, and the first manager manages matching of the sensor ID information and the name representing the real world entity by registering the sensor ID information and the name representing the real world entity in the entry.

7. The sensor network system of claim 6, wherein the first manager further registers attribute information supplementing the name representing the real world entity in the entry.

8. The sensor network system of claim 7, wherein the attribute information is information representing any one of the number of persons to be accommodated in a place, a floor, a building where the sensor is placed.

9. The sensor network system of claim 6, wherein the model type in which at least the sensor ID information and the name representing the real world entity have been registered is referred to as model information, the second manager manages the model information input through the input unit, the second controller outputs the managed model information to the sensor network system, and the first manager manages the output model information.

10. The sensor network system of claim 9, wherein the first controller receives a designation of the model information, reads the sensor ID information registered in the model information designated by the model information, and replaces the read sensor ID information with sensing data acquired by a sensor having the sensor ID information.

11. The sensor network system of claim 9, wherein the second controller acquires the sensor ID information from the model information designated through the input unit and outputs the sensor ID information to the first server, the first controller requests the sensing data of the second server on the basis of the output sensor ID information and the storage address information matched with the sensor ID information, the second server searches for the requested sensing data and outputs the searched sensing data to the first server, the first controller outputs the received sensing data to the client terminal, and the second controller replaces the sensor ID information with the received sensing data.

12. The sensor network system of claim 9, wherein the first or second manager manage by reading data including the device information and the model information described in advance.

13. The sensor network system of claim 1, wherein the sensing data stored by the storage unit is processed data which is calculated from the data sensed by the sensor.

14. The sensor network system of claim 1, wherein the sensing data stored by the storage unit is processed data which is calculated from the data sensed by the sensor.

15. A sensor network system data managing method for use in a sensor network system that includes a first server and a second server that is connected to a sensor node having a sensor and manages sensing data acquired by the sensor, the method comprising:
matching storage address information included in the second server for representing a location where the sensing data is stored with sensor ID information of the sensor;
matching the sensor ID information with a name representing a real world entity included in the first server;
storing the sensing data in a storage unit of the second server; and
outputting the name representing the real world entity and output sensing data corresponding to the name representing the real world entity,
wherein the output sensing data is read from the location represented by the storage address information matched with the name representing the real world entity through the sensing ID information.

16. The sensor network system data managing method of claim 15, wherein the name representing the real world entity represents at least one of a location, a thing, and a person on which the sensor is placed.

17. The sensor network system data managing method of claim 15, wherein the storage address information is matched with server ID information of the server, the server ID information is matched with sensor node ID information of the sensor node, and the sensor node ID information is matched with the sensor ID information, thereby matching the storage address information with the sensor ID information.

18. The sensor network system data managing method of claim 15, wherein a model type is registered to register the sensor ID information and the name representing the real world entity, the model type includes a name for identifying the model type and an entry for defining information representing the model type, and matching of the sensor ID information and the name representing the real world entity is managed by registering the sensor ID information and the name representing the real world entity in the entry.

19. The sensor network system data managing method of claim 18, wherein the model type in which at least the sensor ID information and the name representing the real world entity have been registered is referred to as model information, a designation of the model information is received, the sensor ID information registered in the model information designated by the model information is read, and the read sensor ID information is replaced with sensing data acquired by a sensor having the sensor ID information.

* * * * *